(12) United States Patent
Hamond

(10) Patent No.: US 9,357,598 B2
(45) Date of Patent: May 31, 2016

(54) POWER SUPPLY CONTROL SYSTEM AND DEVICE

(75) Inventor: James Hamond, Richmond (AU)

(73) Assignee: Indice Semiconductor Inc., Tualatin, OR (US)

(*) Notice: Subject to any disclaimer, the term of this patent is extended or adjusted under 35 U.S.C. 154(b) by 260 days.

(21) Appl. No.: 13/992,595

(22) PCT Filed: Dec. 9, 2011

(86) PCT No.: PCT/AU2011/001598
§ 371 (c)(1),
(2), (4) Date: Jun. 25, 2013

(87) PCT Pub. No.: WO2012/075542
PCT Pub. Date: Jun. 14, 2012

(65) Prior Publication Data
US 2013/0264969 A1 Oct. 10, 2013

Related U.S. Application Data

(60) Provisional application No. 61/432,564, filed on Jan. 13, 2011.

(30) Foreign Application Priority Data

Dec. 9, 2010 (AU) ................................ 2010905447

(51) Int. Cl.
*G05F 1/00* (2006.01)
*H05B 33/08* (2006.01)
(Continued)

(52) U.S. Cl.
CPC ........... *H05B 33/0815* (2013.01); *H02M 3/156* (2013.01); *H02M 3/157* (2013.01)

(58) Field of Classification Search
CPC . H02M 3/156; H05B 33/0815; H03F 3/2176; H03K 5/01; H03K 5/02
USPC ............ 315/32, 291, 276, 292–311; 323/282, 323/283–290; 330/251; 713/300, 310, 320, 713/321–324, 330, 340; 363/21.01–21.09, 363/21.1, 21.11–21.18
See application file for complete search history.

(56) References Cited

U.S. PATENT DOCUMENTS 5,956,239 A 9/1999 Giacomini
2006/0056210 A1 3/2006 Yamada et al.
(Continued)

FOREIGN PATENT DOCUMENTS

JP H0898515 A 4/1996
JP H11-178329 A 7/1999
(Continued)

OTHER PUBLICATIONS

Binitha P M, et al., "Comparison of PWM and One-Cycle Control for Switching", International Journal of Emerging Technology and Advanced Engineering, vol. 3, Issue 4, Apr. 2013, http://www.ijetae.com/files/Volume3Issue4/IJETAE_0413_58.pdf, 5 pages.
(Continued)

*Primary Examiner* — Lincoln Donovan
*Assistant Examiner* — Thomas Skibinski
(74) *Attorney, Agent, or Firm* — Stoel Rives LLP; Robert R. Teel

(57) ABSTRACT

A power supply control system for a switch-mode power supply comprises a cycle-by-cycle, asynchronous control scheme. The system makes use of including a signal summing and comparing stage and a control signal feedback system configured to control shaping of first and second portions of a comparison signal provided to comparator circuitry that generates a switching-circuitry drive signal.

13 Claims, 27 Drawing Sheets

(51) Int. Cl.
*H02M 3/156* (2006.01)
*H02M 3/157* (2006.01)

(56) References Cited

U.S. PATENT DOCUMENTS

| | | | |
|---|---|---|---|
| 2007/0041224 A1* | 2/2007 | Moyse et al. | 363/21.01 |
| 2009/0276639 A1* | 11/2009 | Saha et al. | 713/300 |
| 2012/0169246 A1 | 7/2012 | Eddeane et al. | |
| 2013/0088173 A1 | 4/2013 | Otake et al. | |

FOREIGN PATENT DOCUMENTS

JP 2009-232623 A 10/2009
WO 2004059822 A1 7/2004

OTHER PUBLICATIONS

Smedley, "Control Art of Switching Converters", California Institute of Technology, http://thesis.library.caltech.edu/2476/1/Smedley_km_1991.pdf, 1991, 218 pages.

Smedley, et al., "One-Cycle Control of Switching Converters", Power Electronics Group, California Institute of Technology, http://bbs.dianyuan.com/bbs/u/33/1125982576.pdf, 9 pages.

Smedley, et al., "One-Cycle Control of Switching Converters", Power Electronics, IEEE Transactions on vol. 10, No. 6, pp. 625-633, http://ieeexplore.ieee.org/stamp/stamp.jsp?tp=&amumber=471281&isnumber=9936, Nov. 6, 1995, 9 pages.

* cited by examiner

POWER SUPPLY CONTROL SYSTEM AND DEVICE

CROSS-REFERENCE TO RELATED APPLICATIONS

This application is the National Phase of PCT/AU2011/001598 filed on Dec. 9, 2011, which claims priority under 35 U.S.C. §119(e) to U.S. Provisional Application No. 61/432,564 filed on Jan. 13, 2011 and under 35 U.S.C. §119(a) to Patent Application No. 2010905447 filed in Australia on Dec. 9, 2010, all of which are hereby expressly incorporated by reference into the present application.

TECHNICAL FIELD

The present disclosure generally relates to a power supply control system and device using single-cycle control for power sources such as for lights, and, more particularly, to switch-mode power supplies, but not limited to such.

BACKGROUND INFORMATION

A power supply often has an inverter or converter device for the conversion of available power from one set of characteristics to another set of characteristics for meeting specified requirements. A power supply can therefore be a circuit that provides from a mains supply power source an output power with the characteristics suitable for the load. For example, a mains supply power source might have the characteristics of 50 Hertz (Hz), single-phase, 240-Volt AC power found in Australia, whereas the load, such as electronics of a personal computer or a 20-Watt halogen light supply, might expect to receive regulated 5-Volt DC power, in which case a power supply includes a circuit for making the 240-Volt AC power source compatible with a 5-Volt DC load.

A switch-mode power supply is a type of power supply that provides power supply functionality by employing low-loss components such as capacitors, inductors, and transformers; and by the use of switches capable of two states—on or off. An advantage of such a system is that its switches dissipate very little power in either of the two states, and so power conversion can be accomplished at minimal power loss, thereby improving efficiency.

Electronic transformers for halogen lamps are typically designed for 20 Watts (or more) of resistive loads. The conventional inverters that are used expect the correct load so as to maintain oscillation—capacitances greater than 100 pF can stall the conventional inverter. Generally, inverters have over-current detection for detecting currents exceeding a predetermined maximum and, in response, initiating a temporary shutdown. There are two ways a transformer stalls, either incorrect phase shift (capacitive load), or over current.

Typical energy-saving products implement standard diode-based rectifiers including capacitance for stable operation and electromagnetic compliance (EMC). However, inrush currents can exceed 15 Amps when inverters first start, stalling oscillation and damaging rectifiers, causing early failure in both transformers and energy-saving globes.

It is an object of the present disclosure to describe an improved power supply control system and device that overcomes or at least ameliorates one or more of the disadvantages of the prior art.

SUMMARY OF THE DISCLOSURE

According to one aspect, the present disclosure describes a power supply control system comprising a switch-mode power supply having a cycle-by-cycle, asynchronous control scheme.

The control scheme can use logical switching means, wherein the control is for managing the power source to match the desired load, as well as determining the regulation of the load.

The power supply control system can make use of simulated electronic logic gates for the logical switching means and can further include an assimilation and artificial intelligence neural control network, such as a perceptron, to determine the electronic simulation and to make use of a mixing of instant and averaged signals through a feedback system.

Where AC to DC conversion is desired, the power supply control system can further include a rectifier for a front-end supply, the control scheme in the middle for controlling power conversion, and the step-down or step-up circuitry portion for final conditioning of the power conversion.

The control is for managing the power source to match the desired load, as well as determining the regulation of the load.

The power supply can include boosting, which provides a "virtual load" to the electronic transformers.

The cycle-by-cycle, asynchronous control scheme is preferably based on artificial intelligence neural nodes. In particular, it uses a perceptron-type model to provide a control.

The model makes use of multiple inputs and of simulated electronic NAND gates, NOR gates, or combinations thereof.

The model uses feedback in order to correct control and adapt in real time to the changing input waveform.

Further, it preferably uses this perceptron-type model in a hardware approach.

The hardware approach can include using logical switching gates. This allows primitive decision-making to occur at speeds faster than normal, such as in megahertz (MHz) or gigahertz (GHz) speeds, using inexpensive available hardware.

Another embodiment uses an AND or a NAND gate comprising a comparator to receive a sum of voltages of multiple inputs, whereby the conditioned signals can behave like an analog AND or NAND gate. Each input is transformed independently so that the sum will "fire" the comparator once the sum exceeds a reference voltage provided to the comparator.

The AND or NAND gate preferably has multiple inputs in parallel, each conditioned by a respective resistor feeding to and being summed by the comparator.

The present disclosure further provides for a control system comprising a multi-input NOR (or OR) gate comprising a comparator receiving isolated, conditioned signals that can behave like an analog, independently fired, OR or NOR gate. Each input is transformed independently, or proportionally, so that each can fire the comparator once the reference voltage is exceeded.

The multi-input NOR gate preferably has multiple inputs in parallel, each conditioned by a respective diode feeding to the comparator.

The asynchronous systems that are controlled each cycle can have instantaneous peak currents monitored and adjusted in real time. In particular, by mixing of instant and average signals, the input current can be controlled to realize incredibly low ripple current for AND or NAND gates while maintaining control of the output.

The multiple inputs of the multi-input NOR gate can be fed back from both boost current and voltage and load.

The power control can include an active rectifier of input power to guarantee that a FET gate is within the threshold in which there is a FET controller in combination with a linear regulator. The linear regulator can incorporate a large resistor and large Zener voltage so as to minimize power losses through minimizing current in control switching. Control can be analogous to AND or NAND gates.

The power control can include a rectifier formed of a plurality of pairs of P- and N-doped MOSFETs wherein a gate of one P-doped MOSFET (PFET) is connected to a drain of one N-doped MOSFET (NFET), and vice versa. Preferably there is a pair of such pairs of P- and N-doped MOSFETs.

In this way, operation of FETs at voltages of less than 1 Volt is still controlled by the rectifier. This also avoids punch-through, as operation of a pair of MOSFETs cannot occur at the same time.

It can be seen that the present disclosure provides a clockless design with asynchronous operation—up to approximately 2 MHz burst or beyond with very ordinary components.

There is a continuous current mode inductor—virtually no input capacitance. Simultaneous regulation of high and low speed parameters (e.g., load current, voltage, temperature, etc.) is achieved. No electrolytic capacitance is necessary due to high speed and ceramic-based design (inexpensive, incredibly long life, and compact).

The control scheme provides a vastly superior step response due to the single-cycle control.

EMC is facilitated by low, asynchronous ripple. Further, the power factor is improved due to virtually no input capacitance.

BRIEF DESCRIPTION OF THE DRAWINGS

Embodiments of the present disclosure will now be described, by way of example only, with reference to the accompanying drawings, in which:

FIG. 13 shows more complex decision systems including multiple layers;

FIGS. 24A and 24B are operational traces of voltage (V) and current (I), in which FIG. 24A shows the operational trace of the power control circuit of FIG. 21, and, in comparison, FIG. 24B shows the operational trace of the power control circuit of the prior art of FIG. 23, in which FIG. 24B shows clear losses in its lower line compared to that of FIG. 24A showing minimal loss or disturbance;

DETAILED DESCRIPTION OF EMBODIMENTS

The present disclosure, with reference to the drawings, shows a power supply control system and its components, comprising a switch-mode power supply with a cycle-by-cycle, asynchronous control scheme, the control scheme using logical switching means, wherein the control is for managing the power source to match the desired load as well as determining the regulation of the load.

The present disclosure also describes a switch-mode power supply having a cycle-by-cycle, asynchronous control scheme. This makes use of simulated electronic logic gates that are provided in the hardware. However, to determine the electronic simulation and to make use of a mixing of instant and average signals through a feedback system, embodiments of the present disclosure assimilate an artificial intelligence neural control network such as a perceptron.

Referring to FIGS. 1-4, there are four aspects of the switch-mode power supply having a cycle-by-cycle, asynchronous control scheme of the present disclosure.

Figure 1:
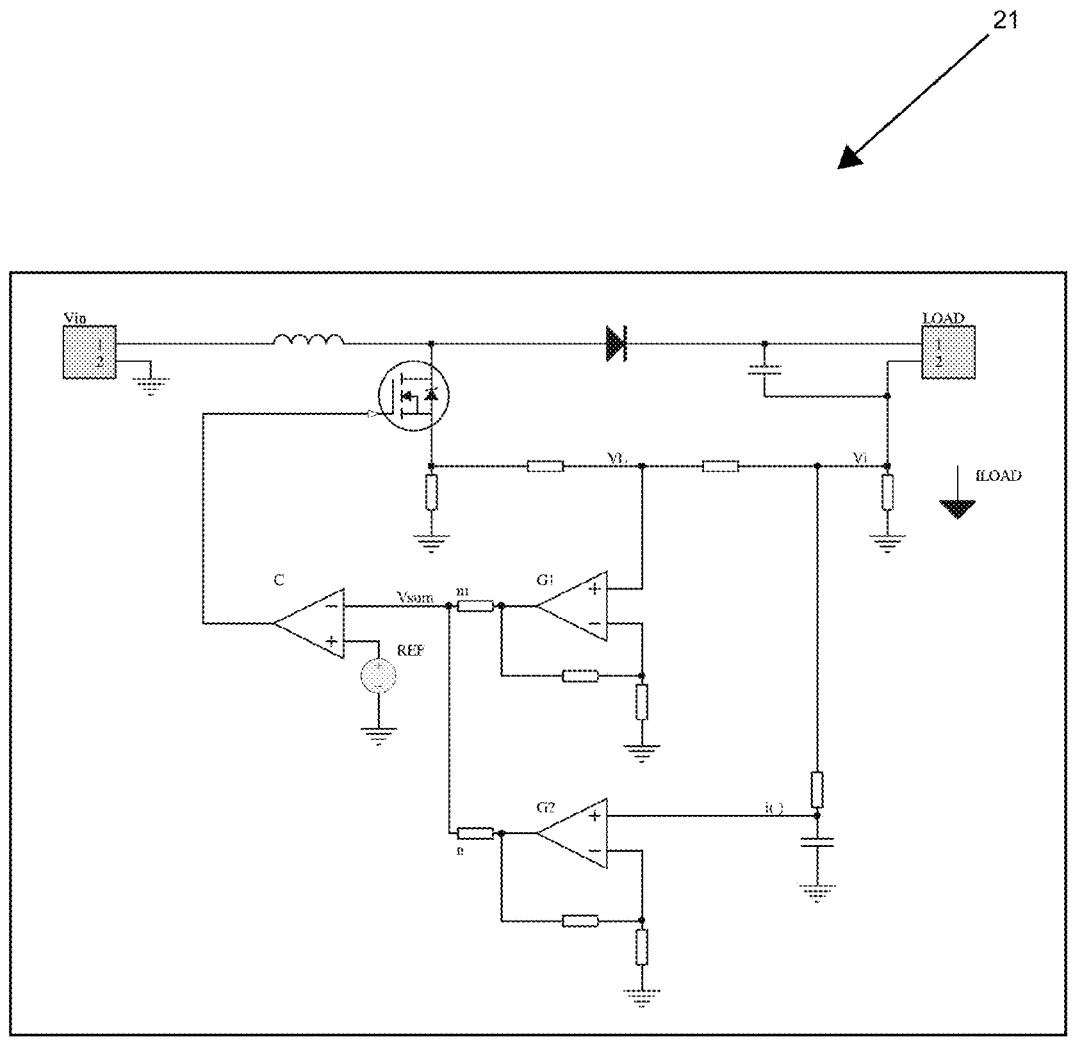
FIG. 1 is a circuit diagram of a simple peak biasing circuit for a power supply control system using single-cycle control in accordance with an embodiment of the present disclosure.

FIG. 1 is a circuit diagram of a simple peak biasing circuit.

$$V\text{sum} = G1 \cdot n/(m+n) \cdot VL + G2 \cdot m/(m+n) \cdot i(Vi)$$

The amplifier, having gain G1, presents Vsum with a scaled signal representing the inductor (or primary winding, in a transformer configuration) current. The amplifier, having gain G2, applies a voltage proportional to the load current sense Vi. The result is a bias that allows the system to trigger on a VL peak that varies inversely with Vi, eventually reaching equilibrium at the desired level. Note that this example uses Vi or load current, but this can easily be any other signal desired for the given application, i.e., voltage, position, frequency, or anything that can be transformed by a suitable function such as i( ).

A limitation of this example is that it relies on the system to reach equilibrium, which is exacerbated when one parameter varies much more slowly than the other. While this makes the system inherently stable, step response is poor.

Figure 2:
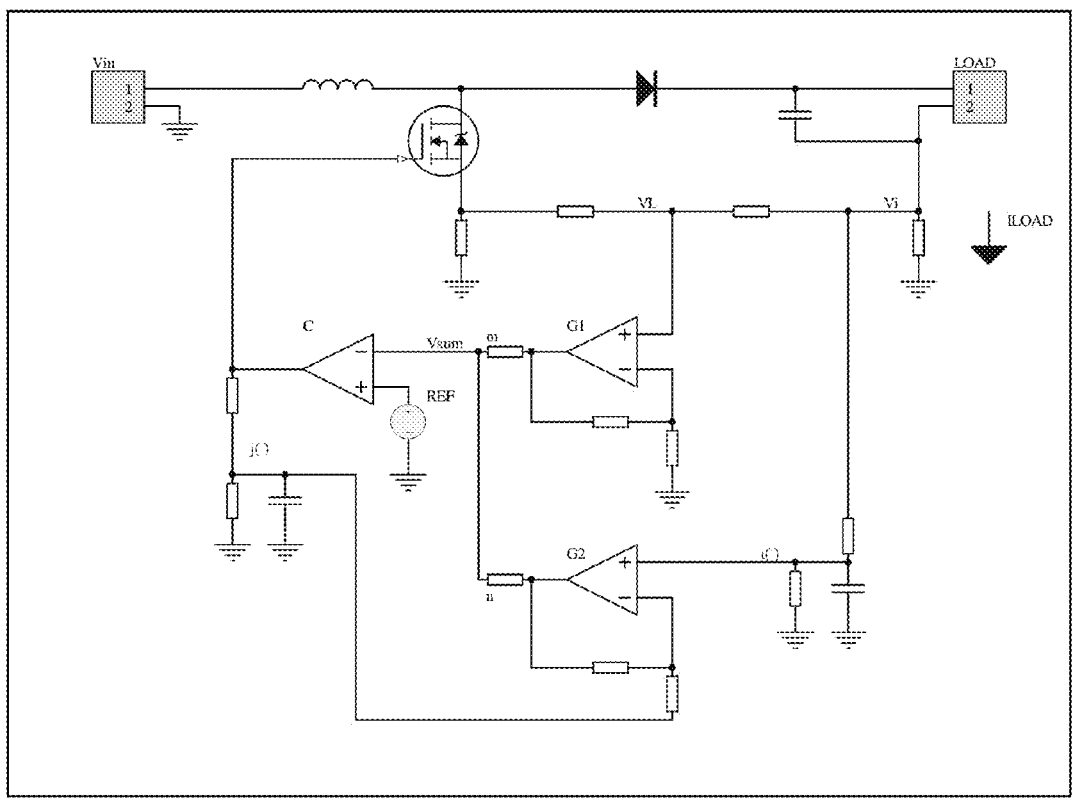
FIG. 2 is a circuit diagram of a load compensation circuit for a power supply control system using single-cycle control in accordance with an embodiment of the present disclosure, showing that additional feedback can be derived from the perceptron output and then subtracted from an input to achieve a desired regulation.

FIG. 2 is a circuit diagram of a load compensation circuit for a power supply control system using single-cycle control.

$$V\text{sum} = G1 \cdot n/(m+n) \cdot VL + G2 \cdot m/(n+m) \cdot (i(Vi) - j(Vc))$$

where $$Vc = du \cdot Vcc$$

$$du = (M-1)/M$$

$$M = r \cdot V\text{out}/V\text{in}$$

du is the duty cycle ratio
r is the transformer ratio, which equals 1 for a normal booster This variation shows an addition of a feedback loop for subtracting the averaged comparator output and including a smoothing function j( ). This novel modification greatly accelerates target parameter convergence by applying negative bias to the load signal j(Vc) while still remaining below the desired level, which in turn results in a higher peak current sought by the reduction in offset at Vsum. This results in higher VL peaks, and, therefore, more power is provided until the desired i(Vi) is reached, at which point j(Vc) drops until equilibrium is reached. Parameter du is useful in indicating the ratio (r·Vout/Vin). As Vin approaches r·Vout, du approaches zero, and du is greatest when Vin approaches zero.

Figure 3:
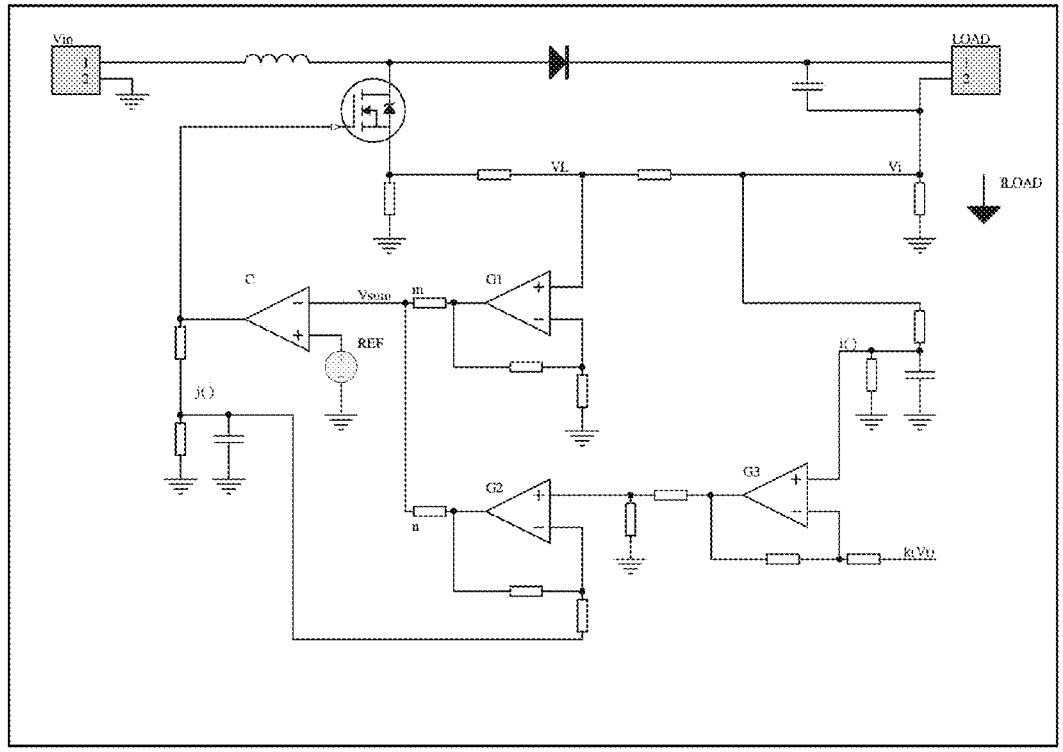
FIG. 3 is a circuit diagram of a load variation control circuit for a power supply control system using single-cycle control in accordance with an embodiment of the present disclosure, showing an addition of an external line allowing current control.

FIG. 3 is a circuit diagram of a load variation control circuit for a power supply control system.

$$V\text{sum} = G1 \cdot n/(m+n) \cdot VL + G2 \cdot m/(n+m) \cdot (G3 \cdot (i(Vi) - k(Vt)) - j(Vc))$$

With the addition of the amplifier having gain G3, the step in stage two can be repeated to subtract yet another signal. Here k(Vt) is subtracted from i(Vi) to allow the target load current to be modified by an external signal.

$$V\text{sum} = G1 \cdot n/(m+n) \cdot VL + G2 \cdot m/(n+m) \cdot (i(Vi) + k(-Vt) - j(Vc))$$

As shown, if inversion of various control signals is possible, amplifiers are optional when summing signals because the inversion and summation is equivalent to subtraction. In other words, the negative sign inside function k( ) removes the need to subtract, and, therefore, the need for an additional amplifier. This reduces cost and complexity.

Figure 4:
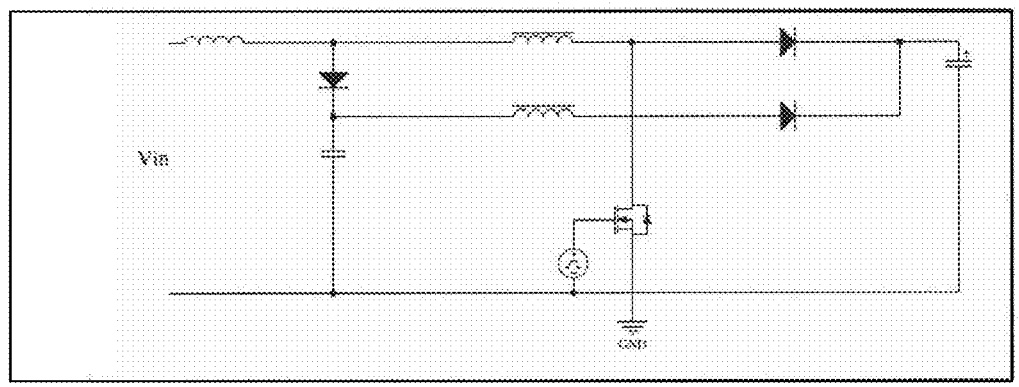
FIG. 4 is a circuit diagram of a voltage clamp for a power supply control system using single-cycle control in accordance with an embodiment of the present disclosure.

FIG. 4 is a circuit diagram of a voltage clamp for the power supply control system. One advantage of the ripple reduction scheme is that rectifier capacitance can be effectively removed. This does present a problem, however, when the input supply has an inductance that is large relative to the system inductance, in which case the resulting current delta can induce large voltages. Fortunately, the switching inductor can be modified to act as a clamp. An equivalent circuit is shown in FIG. 4, where the system appears to have Zener behavior in that it conducts as the input voltage exceeds a threshold. In contrast to a Zener diode, however, is that in a Zener, the energy is lost as heat, whereas in the configuration of FIG. 4, the energy is transferred to the load filter capacitance. This is particularly useful in applications where supply sources react poorly with capacitive loads. By selecting the desired ratios, the voltage clamp will be seen as a very high impedance until the threshold is reached.

In order to understand the operation of the power supply control system employing single-cycle control of the present disclosure, it is helpful to explain the basis of the disclosure, as follows.

Figure 5:
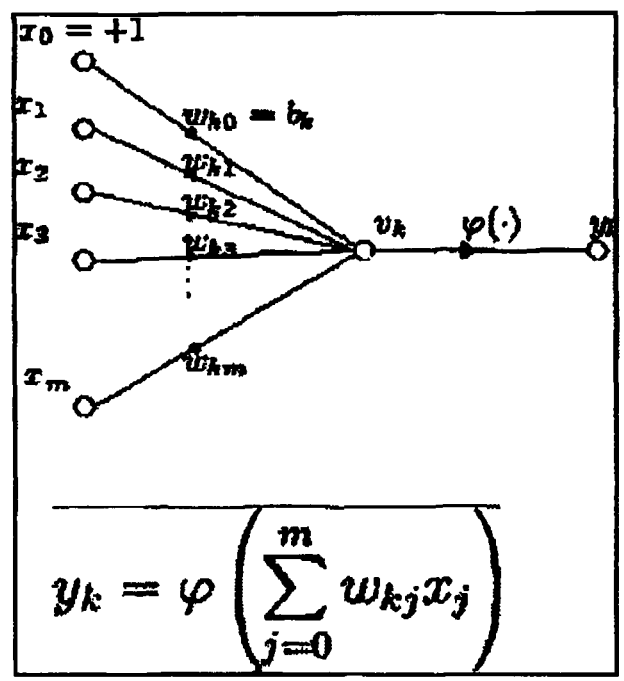
FIG. 5 is a diagrammatic view of an artificial intelligence control of a single-cycle control of the power supply using a perceptron algorithm.

A perceptron model is an artificial intelligence implementation in which a binary classifier maps, via a function, its input to an output value across some range of multiple inputs. As a binary classifier, the output value must be either a "0" or a "1," and, which therefore can be used as a switch. Further, the model provides a learning algorithm that can make use of feedback within the function. A diagrammatic view of this function is shown in FIG. 5.

FIGS. 6-9 show electronic simulation of logic gates.

Figures 6, 7:
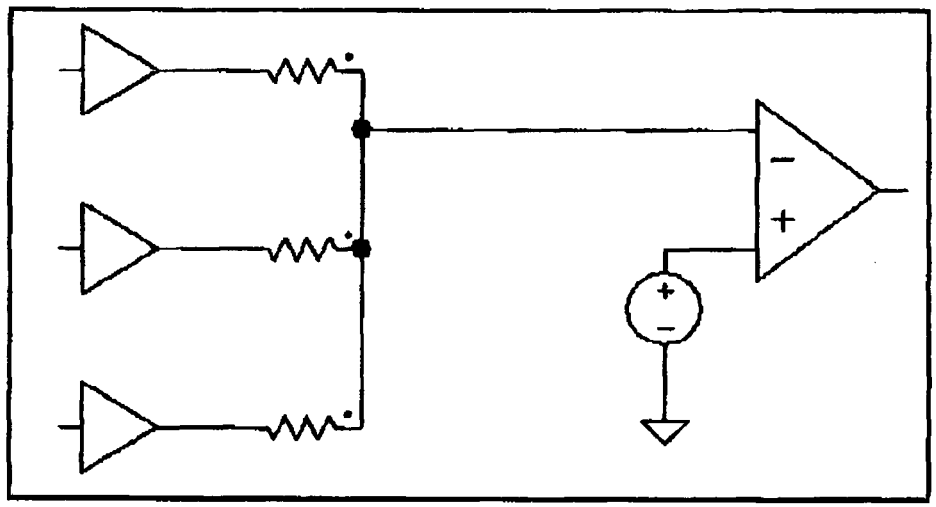
FIG. 6 is a diagrammatic view of a logical multi-input NAND gate and associated truth table.
FIG. 7 is a diagrammatic view of a circuit element simulating such logical NAND gate using the perceptron algorithm, showing the construction using buffers, a resistor network, a comparator, and a bias associated with FIG. 6.

In FIG. 6, a NAND gate, or alternatively an AND gate, is represented by its symbol and truth table.

FIG. 7 shows the electronic simulation making use of a comparator with voltage of multiple inputs summed, whereby the conditioned signals can behave like an analog NAND gate, but could alternatively be an AND gate. Each input is transformed proportionally, so that the sum will "fire" the comparator once the reference is exceeded. The AND or NAND gate has multiple inputs in parallel, each conditioned by the respective resistor feeding to the comparator.

Figures 8, 9:
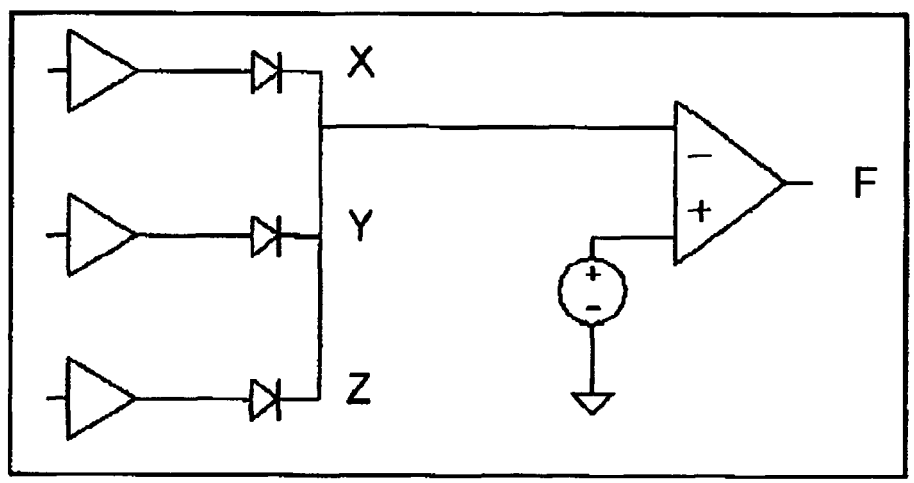
FIG. 8 is a diagrammatic view of a logical multi-input NOR gate and associated truth table.
FIG. 9 is a diagrammatic view of a circuit element simulating such logical NOR gate using the perceptron algorithm, showing a physical construction using buffers, diodes, comparators, and bias associated with FIG. 8.

In FIG. 8, an OR gate, or alternatively a NOR gate, is represented by its symbol and truth table.

FIG. 9 shows the electronic simulation making use of a control system comprising a multi-input NOR gate comprising a comparator with isolated, conditioned signals that can behave like an analog OR or NOR gate. Each input is transformed proportionally, so that each can fire the comparator once the reference is exceeded. The multi-input NOR gate preferably has multiple inputs in parallel, each conditioned by a respective diode feeding to the comparator.

Figure 10:
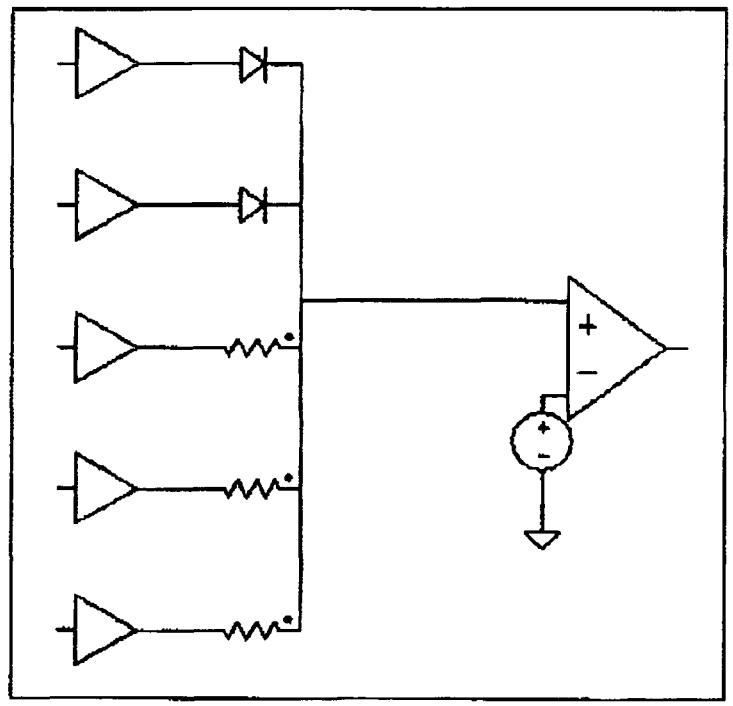
FIG. 10 is a diagrammatic view of the circuit having a combined inclusive and summing perceptron algorithm of FIGS. 7 and 9.
Figure 11:
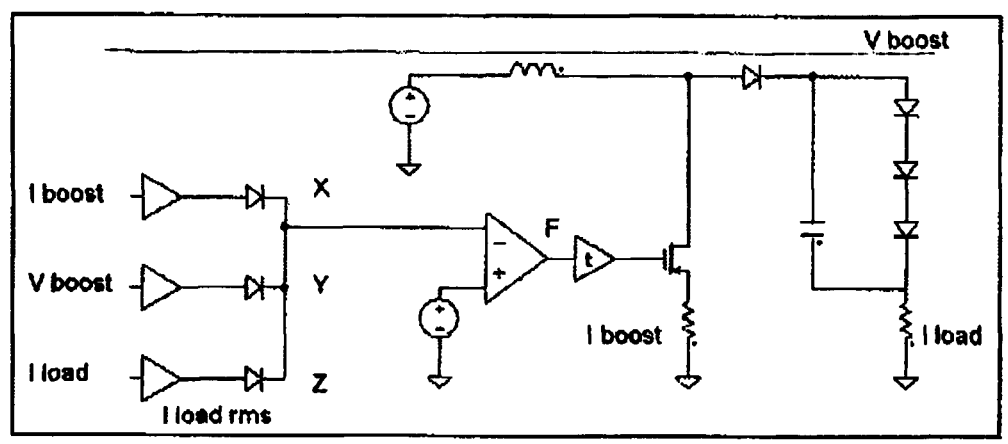
FIG. 11 is a diagrammatic view of the use of the logical multi-input gates of FIGS. 6-10, so as to provide feedback and boost of the current and voltage for efficiency and component size, etc.

FIG. 10 is a diagrammatic view of the circuit having a combined inclusive and summing perceptron algorithm of FIGS. 7 and 9. FIG. 10 includes the NAND gates as an input in parallel with the multi-input NOR gates. As is shown in FIG. 11, the logical multi-input gates of FIGS. 6-10 provide feedback and boost of the current and voltage to minimize inductor ripple that can affect electromagnetic interference (EMI), efficiency, and component size, etc. Such principles can be seen to be included in FIGS. 1-4.

Figure 12:
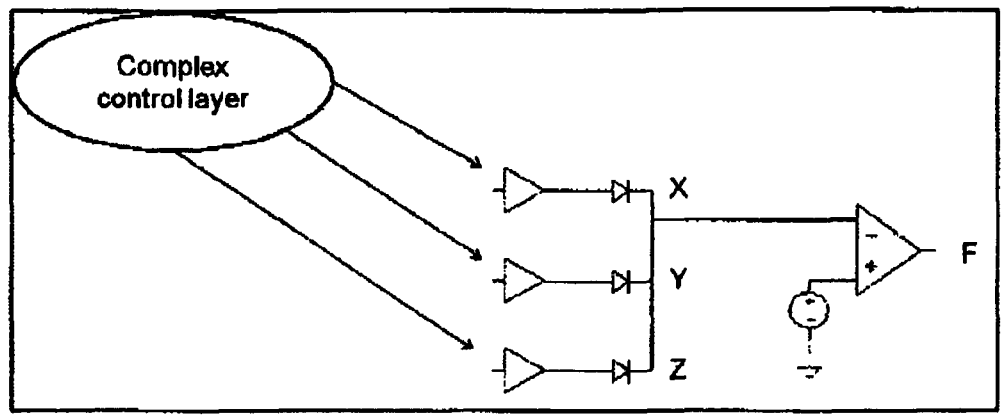
FIGS. 12 and 13 are diagrammatic views of a more complex instruction according to the perceptron algorithm, making use of certain elements simulating logical multi-input gates and showing that the signals can be adjusted by external control as desired. In particular.
Figure 13:
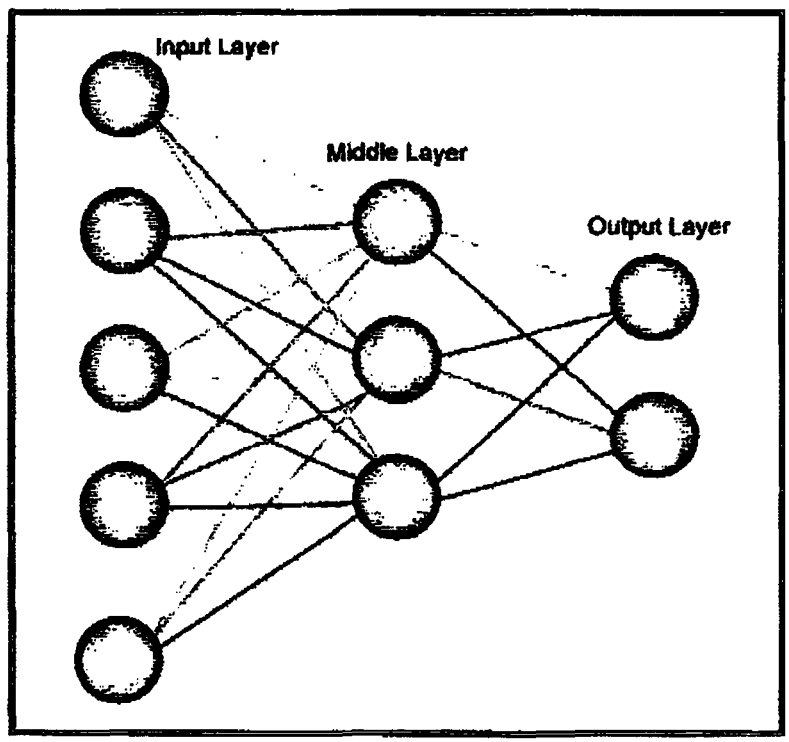

FIGS. 12 and 13 show a more complex instruction according to the perceptron algorithm, making use of certain elements simulating logical multi-input gates and showing that the signals can be adjusted by external control as desired. In particular FIG. 13 shows a more complex decision systems including multiple layers.

Figure 14:
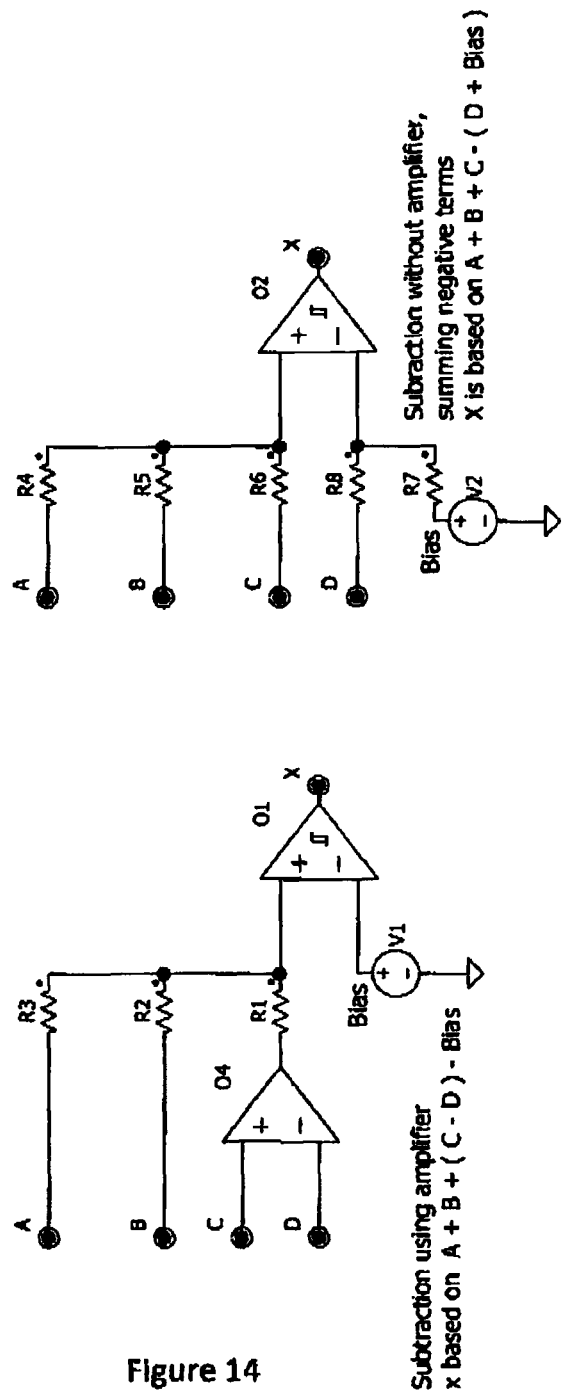
FIG. 14 is a circuit diagram of a subtraction circuit used in a logical switching means of the present disclosure.

FIG. 14 is an improvement over FIG. 2 and includes a power supply control system comprising a comparator with multiple inputs summed into positive input and compared to further input into the negative terminal of the comparator and offset voltage by bias, whereby the sum less the further input less the bias will fire the comparator once the reference is exceeded. In this way, an addition of a feedback loop subtracts the averaged comparator output using comparison to bias feedback, which greatly accelerates target parameter convergence by applying negative bias to the load signal when below the desired level, which in turn results in a higher peak current sought by the reduction in offset, which results in more power being provided until the desired current is reached, at which point it drops until equilibrium is reached.

Referring to the original section on signal summing, adding voltages can be as simple as summing resistor networks, whereas to subtract one signal from another may employ an amplifier utilizing the positive and negative inputs. Depending on the desired relative scaling of each signal, it may be possible to sum all "like signed" signals into the perspective inputs of the summing comparator instead. For example, instead of:

$$V\text{sum}=G1 \cdot n/(m1+n1) \cdot VL+G2 \cdot m/(m1+n1) \cdot (G3 \cdot (i(Vt)-k(Vt))-j(Vc))$$

where Vsum is compared with a fixed value such that the resulting output is:

$$V\text{sum}>V\text{ref}, \text{Output}=0$$

$$V\text{sum}<V\text{ref}, \text{Output}=1$$

We can instead group the negative terms and sum them into Vref, and group positive terms and sum them into Vsum, so:

$$V\text{sum}=n/(m+n) \cdot VL+m/(m+n) \cdot i(Vt)$$

$$V\text{ref\_new}=x/(x+y+z) \cdot V\text{ref}+y/(x+y+z) \cdot k(Vt)+z/(x+y+z) \cdot j(Vc)$$

where Vsum is compared with a fixed value such that the resulting output is:

$$V\text{sum}>V\text{ref\_new}, \text{Output}=0$$

$$V\text{sum}<V\text{ref\_new}, \text{Output}=1$$

This can achieve the same result without the need of amplifiers, reducing cost and complexity.

It can therefore be seen that the power supply control system provides the following in some form:

| Problem | Competitors | Current Invention. |
| --- | --- | --- |
| Compatibility with existing infrastructure - huge variety of product in the field | Not rated or warranted to work with electronic transformers | Works with existing electronic and magnetic transformers |
| Dimming with existing infrastructure | Poor dimming and compatibility issues with existing installations | Dims with electronic transformers on correctly installed dimmers |
| Electronic transformers operate at a minimum load of 20 W draw | Fail to draw minimum load and not warranted with electronic transformers | Virtual load allows transformers to operate correctly. |
| Power factor | Varies greatly and usually poor (0.3-0.5 typically) | Higher power factor: the system draws current in phase with the mains input (0.6-0.7 typically, higher if desired) |

It can therefore be seen that the present disclosure provides a new approach to single-cycle control inspired by the simple, yet powerful, perceptron model. While simple in construction, the perceptron can make very simple decisions based on multiple inputs incredibly quickly, and even faster when implemented in hardware. This provides many commercial implications, particularly with respect to switch-mode power supply, bringing many added benefits, such as asynchronous (clockless) operation with latencies limited only by the native silicon.

Although switching speeds of 2 MHz can readily be achieved to switch, the speeds can extend well beyond to about 3-5 MHz due to limitations of current FETs. However, if this limitation is overcome, even far greater speeds could be achieved.

Examples of Usage

As illustrated in FIGS. 15-18, alternative topologies (or published derivatives of these topologies) can be controlled by duty cycle or component values or current for voltage applied to a circuit node or nodes.

Figure 15:
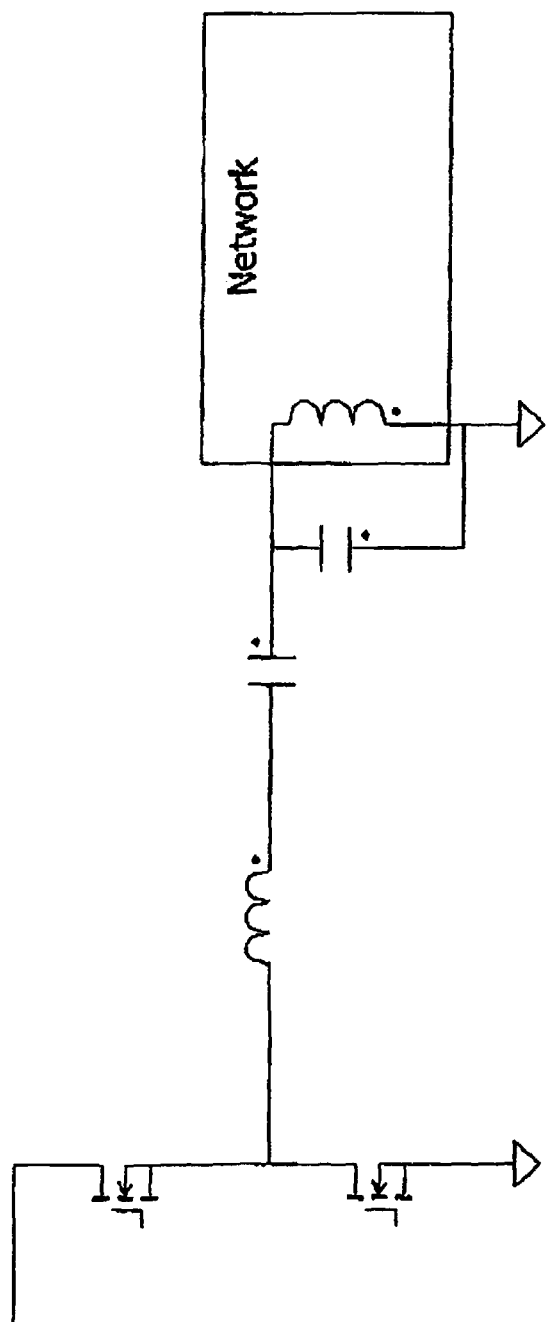
FIGS. 15, 16, 17, and 18 are diagrammatic views of various topologies controlled by duty cycle.

FIG. 15 shows a class-d stage (either one or the other switch is on or in the changeover state) loaded via a series resonant circuit, and a network that loads this resonant circuit by passive and/or active means. The complexity is greater (two switches), but the device voltage is the same as the input voltage.

Figure 16:
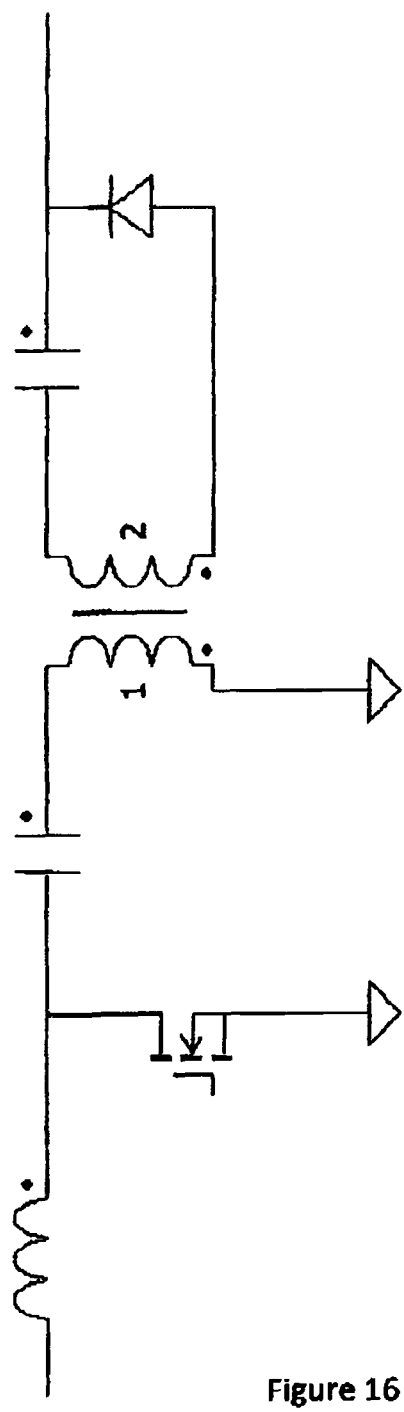

FIG. 16 shows a class-e stage (a single switch loaded by various stages connected to the switch via a series resonant circuit) loaded by a half-wave rectifier and decoupling capacitor. It is a single-input device stage that can be designed to zero voltage switch (ZVS) with high speed and very good efficiency at low or medium power levels, along with very good EMI profiling.

Figure 17:
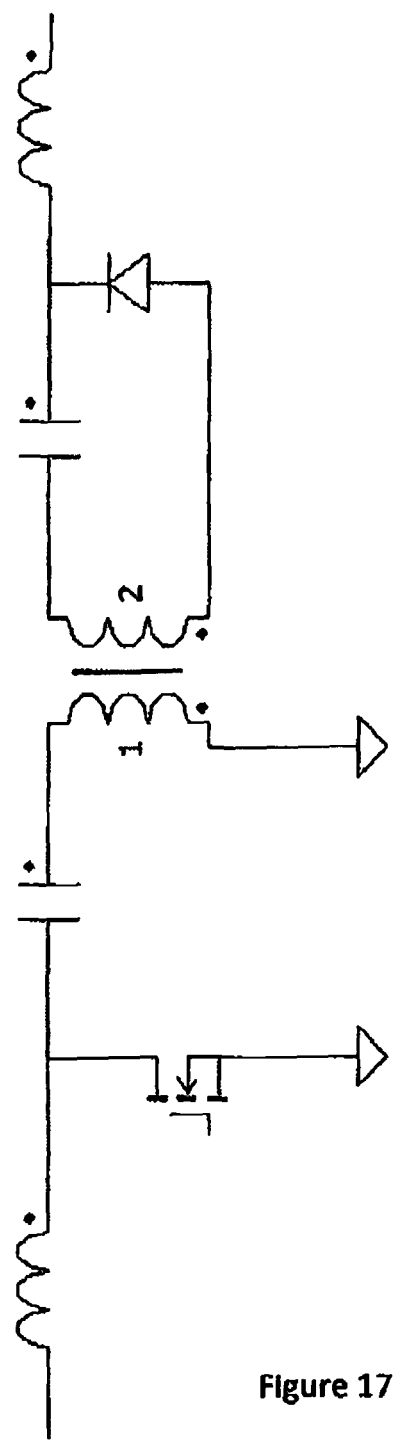

Other half- or full-wave circuits may be used, including but not limited to half-wave inductive and in class-e form, such as in FIG. 17, with cap loading across diodes, cap loading across secondary synchronous and asynchronous rectifiers, class-d type rectifiers, class-e rectifiers, and variations and combinations to achieve the advantages of ZVS and class-e stages.

Figure 18:
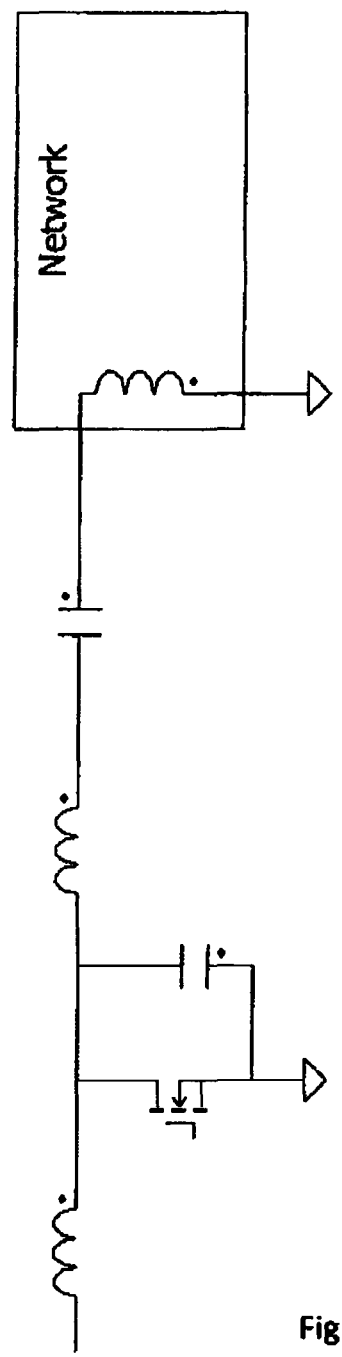

Many of these alternatives are shown in descriptive form in FIG. 18, where the class-e stage is loaded by a network, which can consist of active and/or passive components that load the class-e stage.

Figure 19:
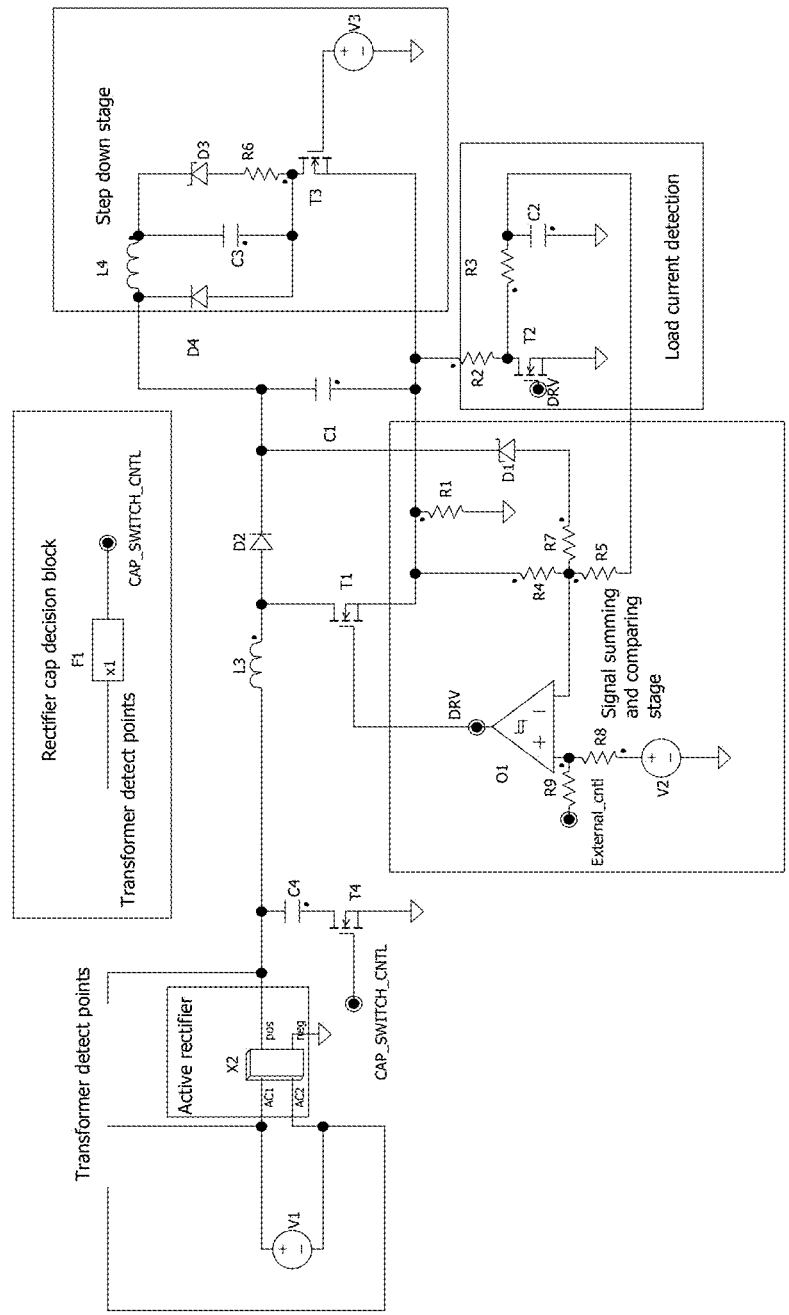
FIG. 19 is a diagrammatic view of a possible complete circuit having rectifier and step-down sections.

One application is shown in FIG. 19. The power supply control system includes the rectifier for front-end supply, the control scheme in the middle for controlling power conversion, and the step-down or step-up as final conditioning of the power conversion. It can clearly be seen that FIG. 19 uses the logical gate system of FIGS. 7 and 14 to provide control from the feedback, including in the load current detection subcircuit.

The power supply control system according to FIG. 19 comprises a comparator O1 having positive (O1+) and negative (O1−) input terminals, and a DRV output terminal. The positive terminal is shown as being configured to receive a reference signal from a voltage divider formed from R8 and R9 resistors. Thus the positive input terminal (O1+) receives multiple resistively summed reference signals, including a offset bias voltage, to establish a reference signal V(O1+). The negative input terminal (O1−) receives multiple resistively summed feedback signals. As shown in FIG. 19, a comparison signal summing node is the junction of R4, R5, R7 and the negative input terminal (O1−). Thus, the comparator O1 receives at its negative terminal (O1−) a comparison signal V(O1−).

The comparator compares voltages at its input terminals, whereby the so-called "summed" feedback signals less the further reference signals (e.g., less the bias) will "fire" the comparator once the reference is exceeded. Because O1 is a comparator, its DRV signal is based on a comparison between the reference and comparison signals applied to the two comparator input terminals.

Figure 20:
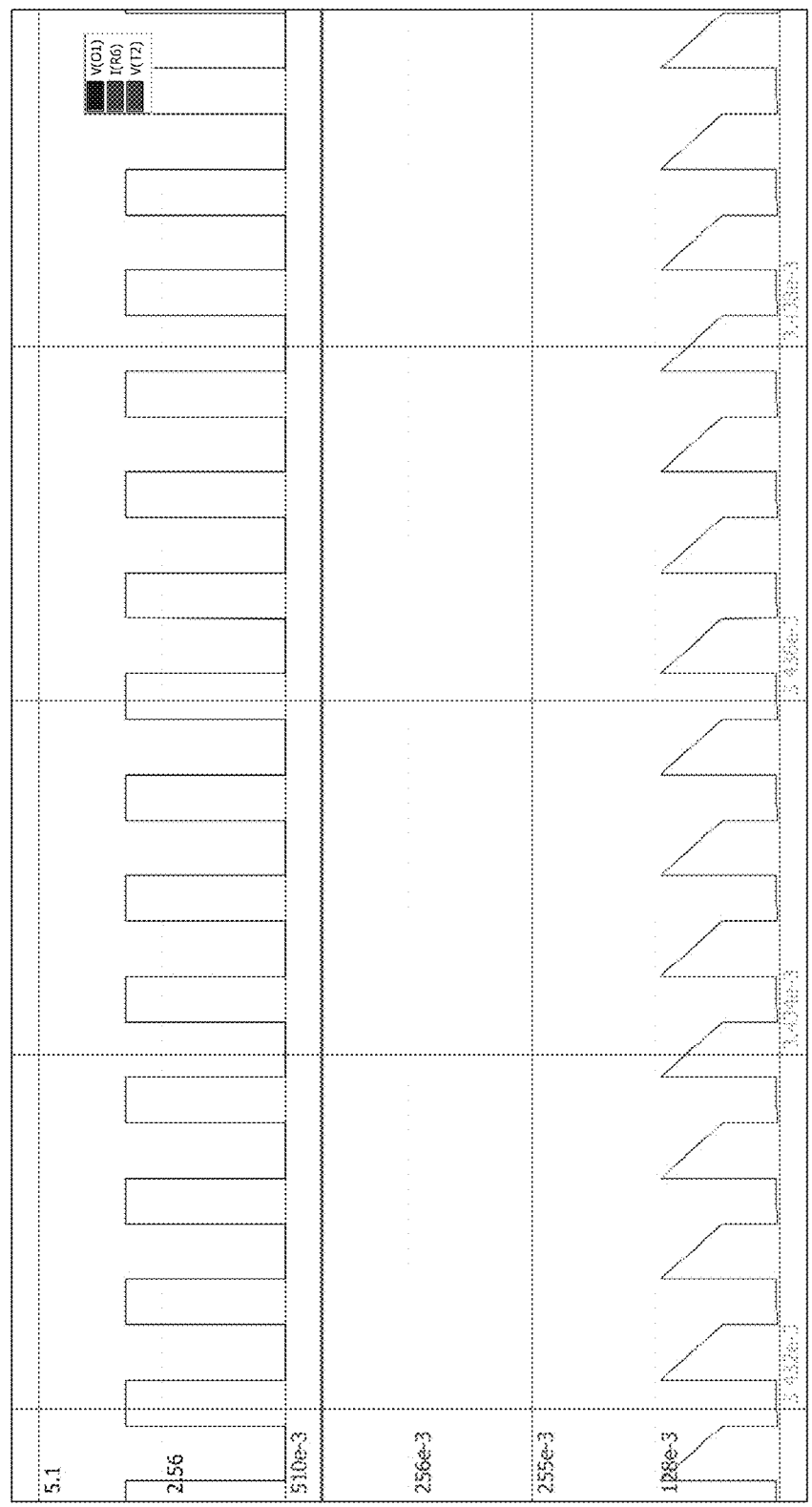
FIG. 20 is a trace of a gated input current with regard to the circuit of FIG. 19.

For example, FIG. 20 is a set of three signal timing diagrams titled "Gated input current." The figure includes in its upper right-side corner a legend labeling the top, middle, and bottom timing diagrams, respectively, "V(O1)," "I(R6)," and "V(T2)."

The first diagram, labeled "V(O1)," shows a portion of a switching-circuitry drive signal (labeled "DRV" in FIG. 19) having a duty cycle indicated by the x-axis of FIG. 20. The DRV signal in FIG. 19 (i.e., V(O1) in FIG. 20) is applied to gates of transistor switches "T1" and "T2" of FIG. 19.

The comparison signal V(O1−) includes "first" and "second" (i.e., high and low) portions that switch the comparator O1 output (again, labeled "DRV" in FIG. 19 and "V(O1)" in FIG. 20). For example, the "V(O1)" diagram of FIG. 20 indicates that DRV voltage is cycled on and off. During the off state, FIG. 20 shows that V(O1) is low (i.e., V(DRV) is low), and FIG. 19 shows that this voltage is applied to gates of T1 and T2 to switch these transistors off. During the on state, FIG. 20 shows that V(O1) is high (i.e., V(DRV) is high) so that T1 and T2 are switched on. The first and second portions are asynchronous to each other because FIG. 19 shows that there is no clock controlling the cycling and because when V(O1) of FIG. 20 is high, then the comparison signal V(O1−) is lower than a reference signal V(O1+), and so forth.

FIG. 19 shows control signal switching circuitry, T1, and a rectangular region labeled, "Load current detection." The circuitry is collectively responsive to the DRV signal, as shown by the "DRV" label placed near the gates of T1 and T2. The shape of the comparison signal, and the fact that it has different levels during the on and off states, is a function of the current through R4, R5, and associated components (e.g., C2) that establish a voltage at the node of negative input terminal O1−. This relationship is also shown by the "V(T2)" timing diagram of FIG. 20: when T2 is off, V(T2) is shown as gradually decreasing. FIG. 19 indicates that the gradually decreasing "V(T2)" voltage at the node formed at the junction between R2, R3, and the drain of T2 appears (proportionally) as the comparison signal summing node voltage V(O1−) because this voltage is the sum of V(C2) and V(R5). Accordingly, because V(T2) is decreasing during the off state, V(O1−) at the comparison signal summing node is also decreasing, thereby adjusting the comparison signal level. Likewise, when T2 is on, V(T2) is shown at zero voltage, C2 discharges, and V(O1−) gradually increases so that the cycle may be repeated upon triggering another change in the comparator O1 output, "V(O1)."

The power supply control system includes a feedback loop subtracting the averaged comparator output using comparison to bias feedback, which greatly accelerates target parameter convergence by applying negative bias to the load signal while it is below the desired level, which in turn results in a higher peak current sought by the reduction in offset, which results in more power being provided until the desired current is reached, at which point it drops until equilibrium is reached.

The schematic of the power supply control system further includes the rectifier for front-end supply, the control scheme in the middle for controlling power conversion, and the step-down or step-up as final conditioning of the power conversion. It illustrates the various major stages, consisting of:

1. Signal summing and comparing
2. Load current detection
3. Step-down
4. Rectifier capacitor decision The combination of these stages results in a system capable of reacting to various environments in a way that allows correct low-energy product compatibility, very similar in behavior to a halogen globe.

Rectifier

Figure 23:
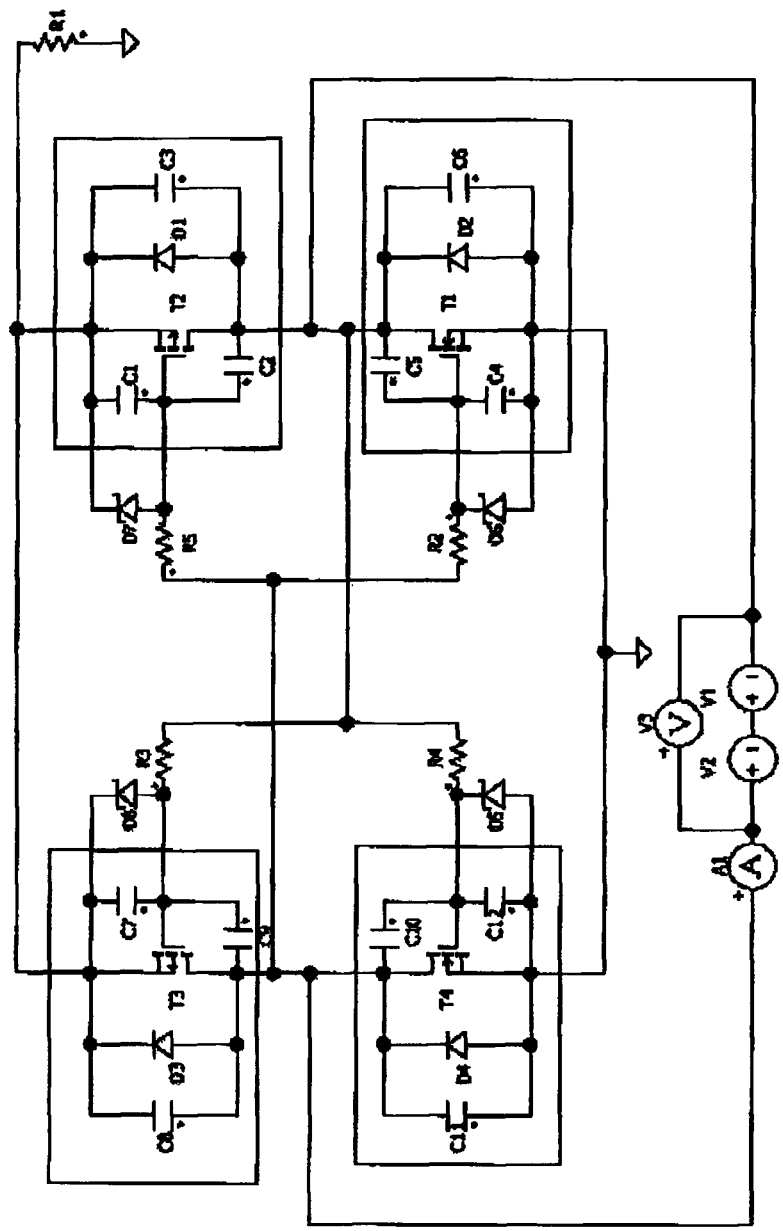
FIG. 23 is a circuit diagram of power control of a rectifier of prior art, shown for purposes of comparison with FIGS. 22A and 22B.
Figure 24A:
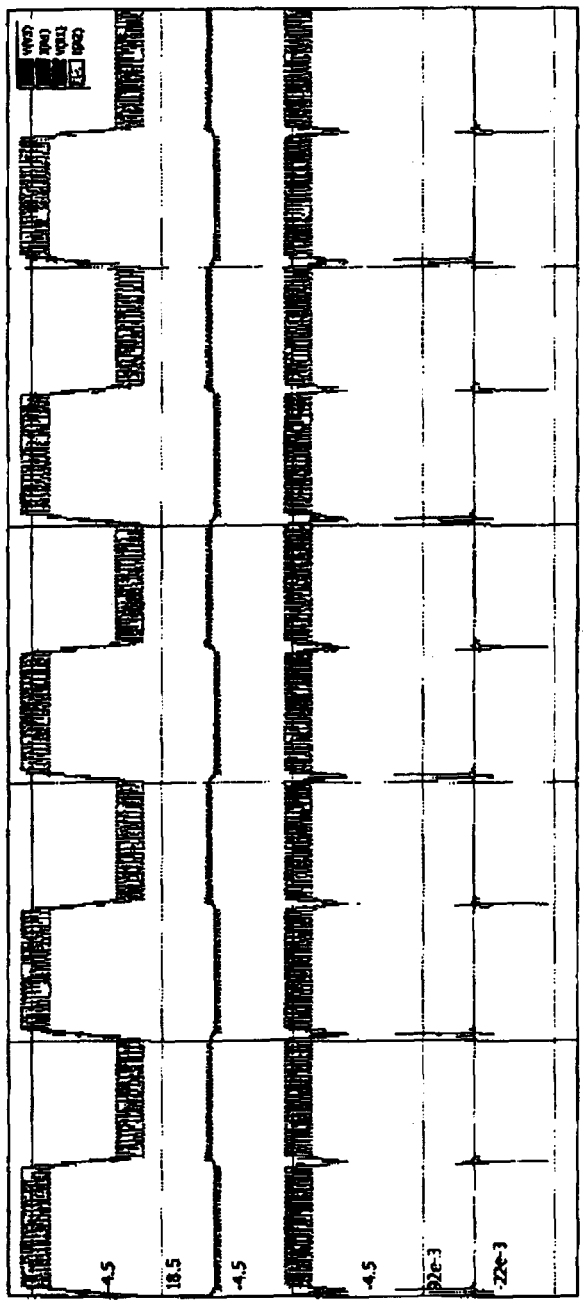
Figure 24B:
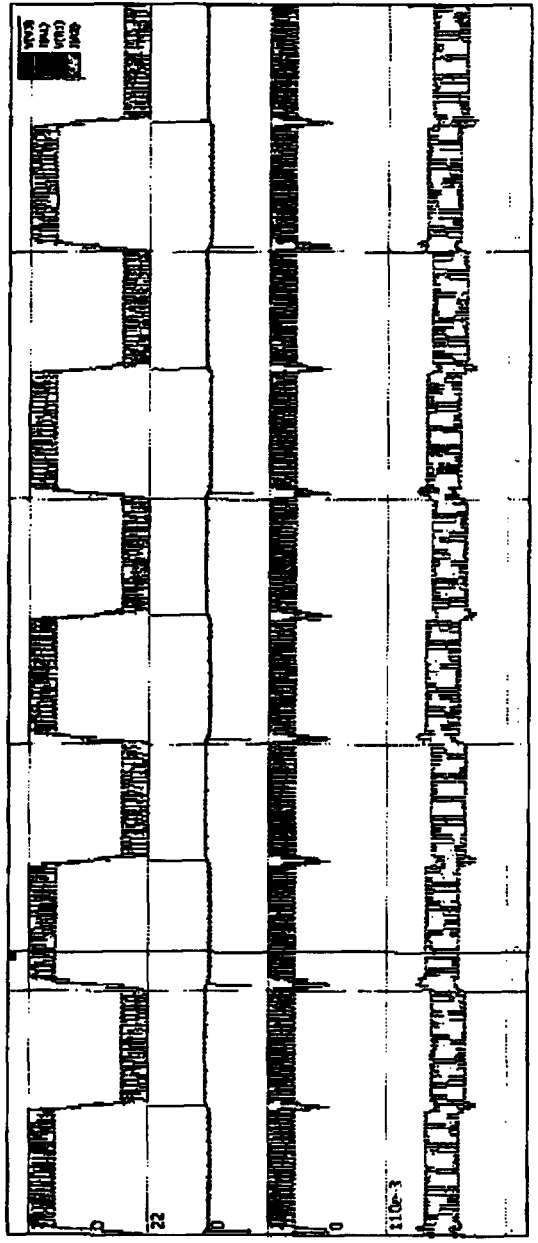

A prior-art active rectifier circuit can be seen in FIG. 23, with its operational trace shown in FIG. 24B. In particular, the FETs—either P type or N type—are connected to external resistors such as R4, which are of the order of 100 Ohm and therefore allow substantial current flow and corresponding power loss. In particular, the trace of FIG. 24B shows the input at the top and the effective output in the middle. However, as shown by the lower trace, there is substantial power loss throughout operation.

Figure 21:
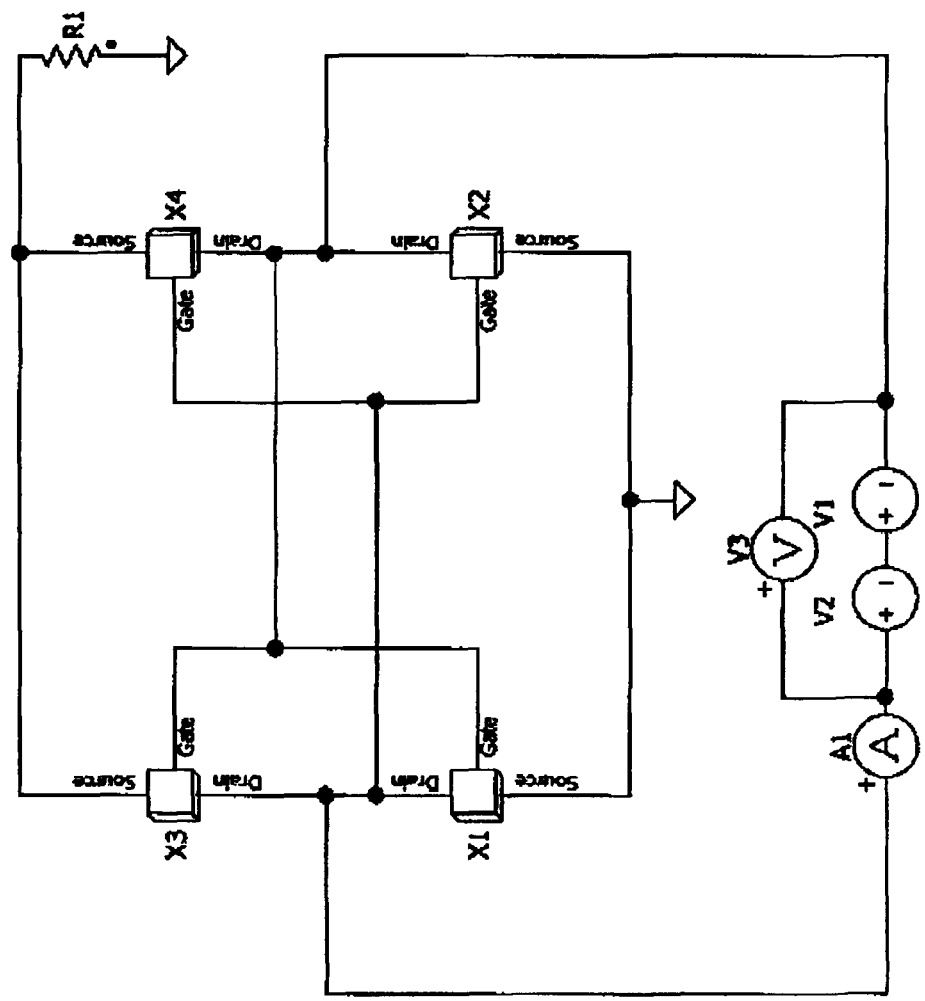
FIG. 21 is a circuit diagram of power control of one embodiment of the present disclosure, showing a rectifier.
Figure 22A:
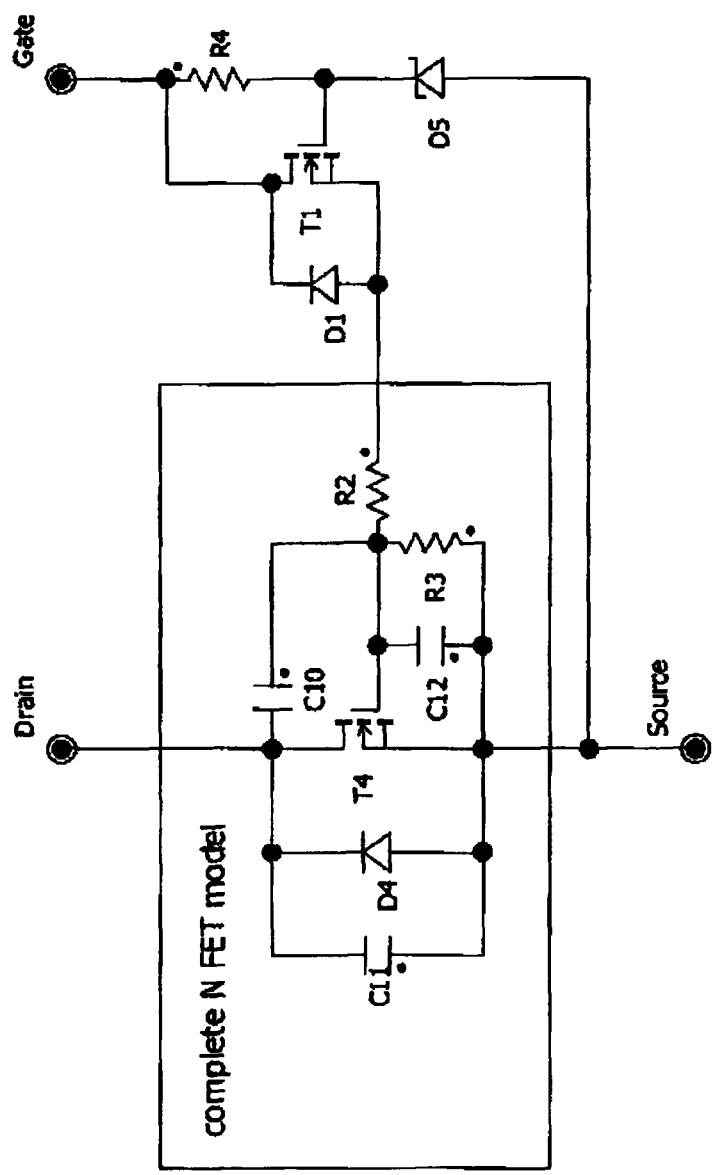
FIGS. 22A and 22B are circuit diagrams of, respectively, NFET and PFET models for use in the rectifier of FIG. 21.
Figure 22B:
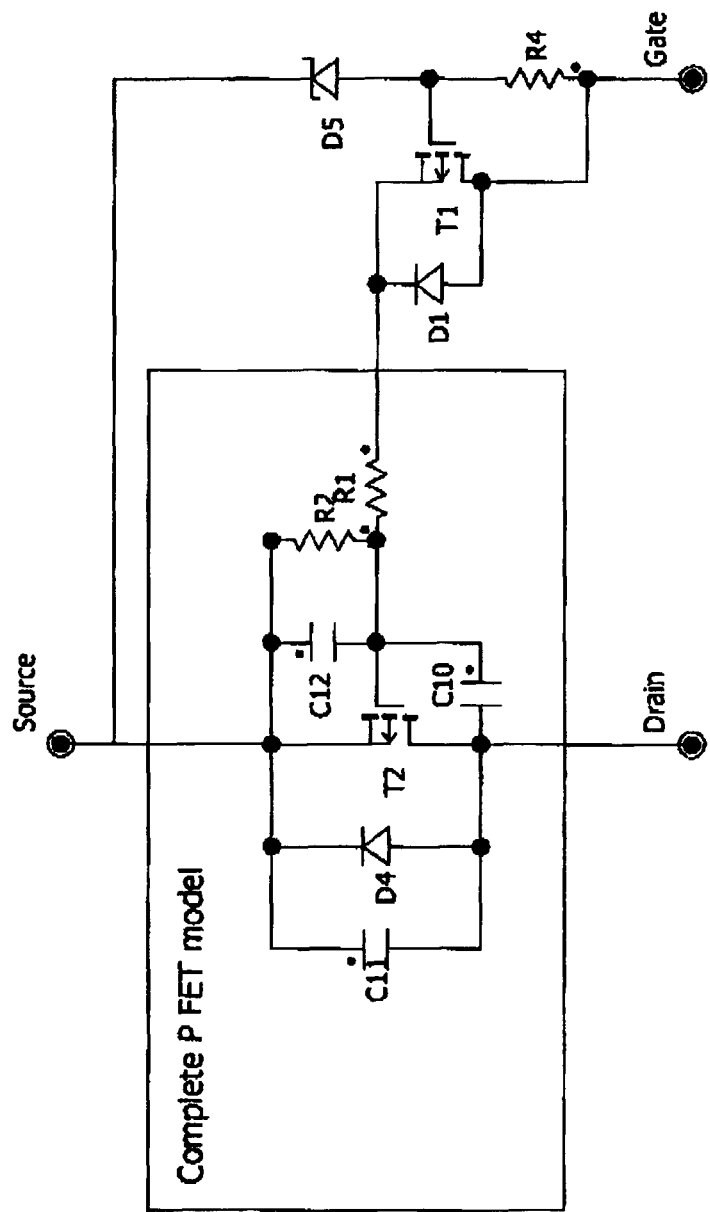
Figure 25:
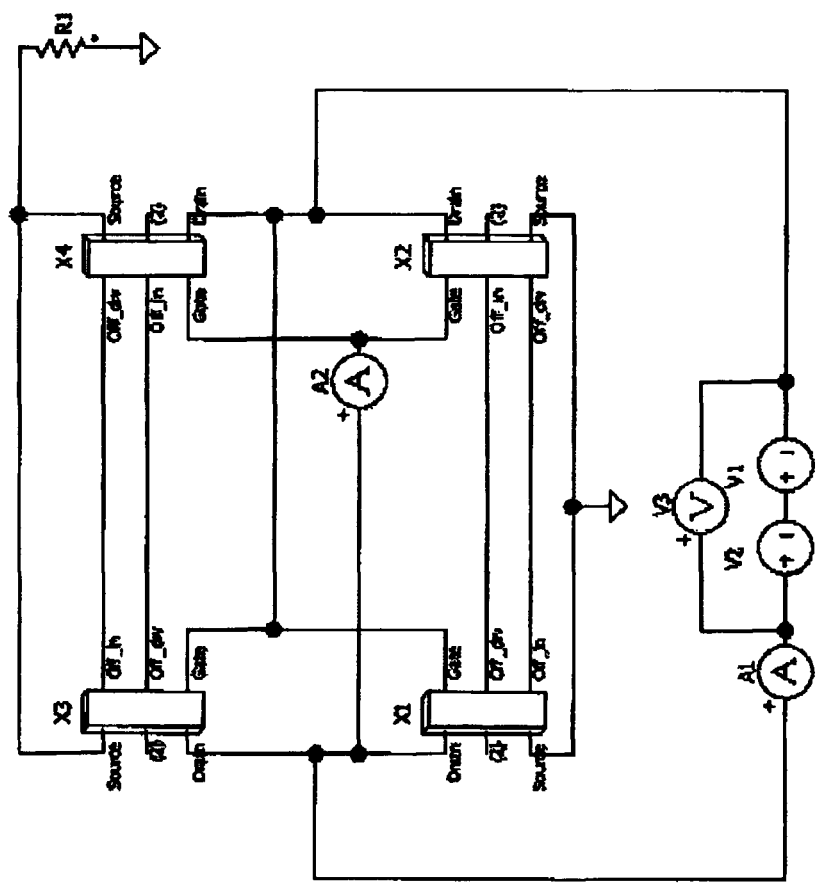
FIG. 25 is a circuit diagram of power control of one embodiment of the present disclosure, showing a rectifier with active pulldown.

However, the embodiment as shown in FIG. 21 in its simplest form, and in FIGS. 22A, 22B, and 25 in detail, with the trace shown in FIG. 24A, comprises a rectifier that can make use of the power control, including an active rectifier of input power, to guarantee the FET gate is within threshold. This is achieved by a FET controller in combination with a linear regulator. The linear regulator can incorporate a large resistor R4 of the order of 100K Ohm and a voltage close to the operative voltage of the FET, so as to minimize power losses by minimizing current in control switching. In contrast to the trace of FIG. 24B, the trace in FIG. 24A shows the input at the top and the effective output in the middle, with the lower trace showing minimal intermittent power losses throughout operation.

As shown in FIG. 21, the power control can include a rectifier formed of a plurality of pairs of P- and N-doped MOSFETs, wherein the gate of one P-doped MOSFET is connected to the drain of one N-doped MOSFET, and vice versa. In this case, there are a pair of pairs of P- and N-doped MOSFETs; each of X1 and X2 is an NFET, and each of X3 and X4 is a PFET of FIGS. 22A and 22B.

In this way, operation of FETs with voltages of less than 1 Volt are still controlled by the rectifier. This also avoids punch-through, as operation of both MOSFETs cannot occur at the same time and therefore cannot add voltages beyond threshold.

Particularly in low-voltage, high-current applications, AC to DC rectification can be more efficiently performed with a FET full bridge rather than diodes (Schottky, PN, carbide, etc.), as the forward conduction voltage drop is not anywhere near as large. Here are some considerations in implementation:

1. If the maximum voltages exceed the FET gate values, protection must be implemented to ensure the MOSFETs are not destroyed. This is the purpose of the Zener/resistor arrangement in the schematic provided.

2. The Zener should be just slightly smaller than the maximum gate voltage; otherwise conduction through the Zener consumes large amounts of energy, and this unfortunately means that the gate capacitance has far more energy than is necessary to turn on the FET.

3. The resistor must be large enough to limit current when the input voltage exceeds the Zener, but small enough to keep the turn-on and turn-off time small enough and to prevent FET shoot-through.

4. As MOSFETs have gate capacitance, any resistance used, as with the example, can cause issues with turn-on and turn-off delay.

5. The gate capacitance and resistor form an RC filter, which will consume energy when any AC is present on the input, worsening with frequency and amplitude.

The new configuration shown in FIG. 21 looks similar to the prior art of FIG. 23. However, clear differences are shown with further inspection into the X modules as given in FIGS. 22A and 22B. Each subcircuit (N and P) is designed to replace the MOSFET, Zener, and resistor in the prior art, with the N's on the bottom and the P's on the top of the bridge.

Examining the NFET subcircuit of FIG. 22A, the complete FET model is represented within the box. External to the box is the added circuitry, a diode and FET (which would be only one device, as MOSFETs always have body diodes), a resistor, and a Zener. The addition of the MOSFET has a large impact on the circuit, such as:

1. The Zener can now be only large enough to ensure the rectifier FET is turned on, keeping the transfer of energy low.

2. The MOSFET's impedance is low during the charge of the bridge MOSFET, which allows for rapid charge, but the impedance becomes very high once the Zener voltage is reached, ensuring no leakage regardless of what AC signal is on the input.

3. As the Zener bias resistor is no longer charging the bridge MOSFET gate cap, its value can be very large, using very little energy.

4. When the gate signal pulls low, D1 (T1's body diode) discharges the bridge gate capacitance.

The PFET subcircuit shown in FIG. 22B is identical in operation, just in a negative voltage sense, as it is a PFET.

Referring to the trace files of prior art (FIG. 24B) and the new active rectifier (FIG. 24A), the top trace shows a constructed wave form, a base signal of 12 Volts RMS (+/−17 Volt peak to peak) AC, and a 5-Volt peak-to-peak signal at much higher frequency. The next trace indicates the current from the source. The penultimate trace (from the top) shows the voltage on the load resistor R1. The final, lower trace is the current going into one half-bridge P/N FET pair. The greatest indicator of improvement is the trace of FIG. 24A, as illustrated in the lower trace of the new active rectifier, with the exception of switching currents, showing no visible current. Measurements have indicated that the new system is 98% efficient, versus the 95% efficiency of the prior art. This difference would become much greater over large input voltage ranges, as the Zeners in the prior art conduct more and more, or if the frequency was increased.

Figure 26:
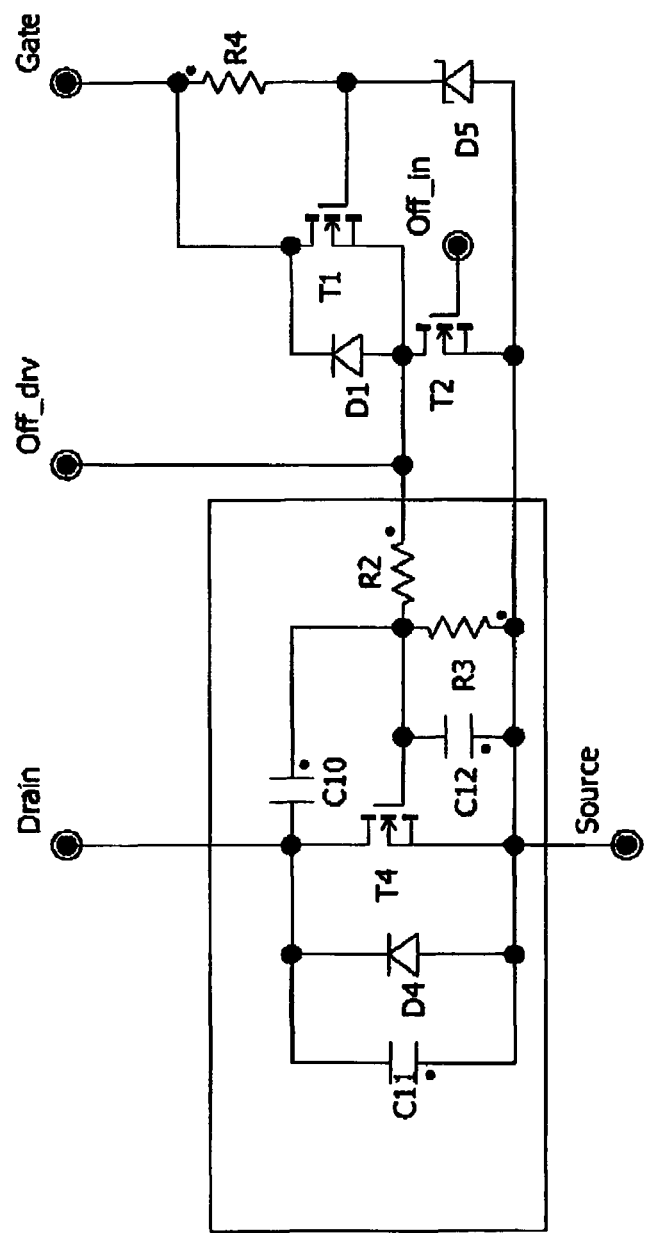
FIGS. 26 and 27 illustrate NFET and PFET equivalent subcircuits, respectively, showing the details of FETs X1-X4 of FIG. 25 in combination with a linear regulator.
Figure 27:
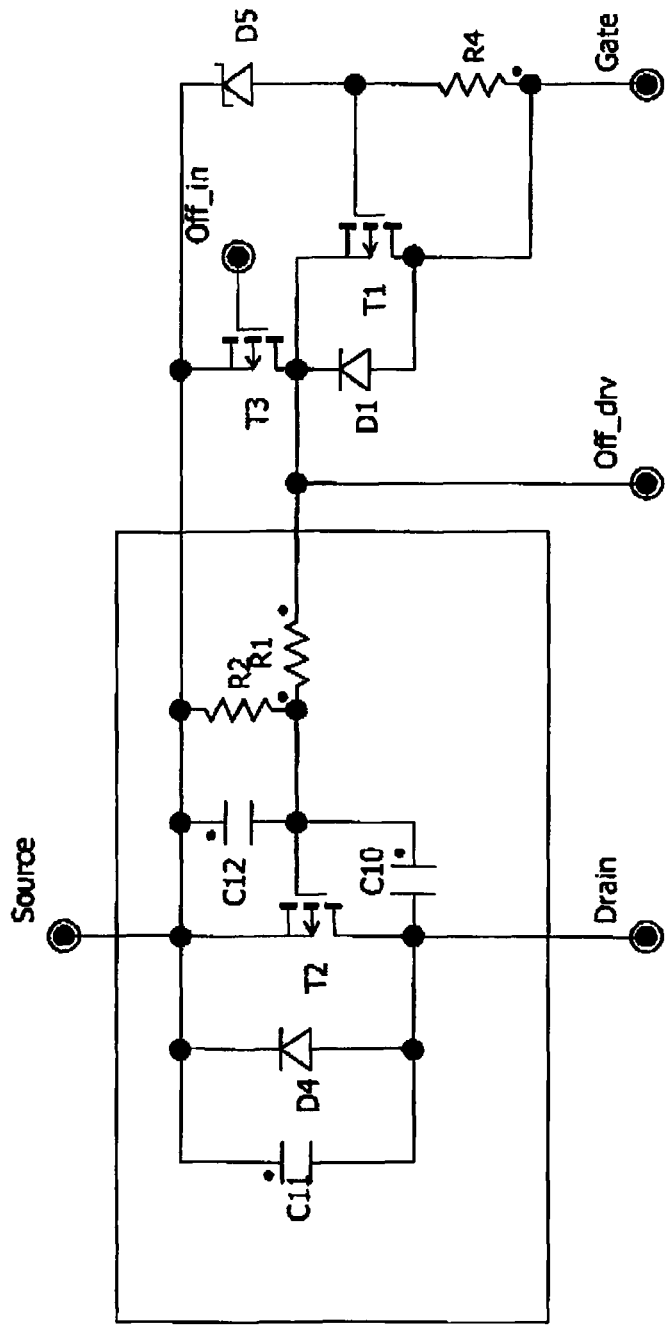

The iteration of FIG. 25, with reference to FIGS. 26 and 27, shows an enhancement that allows the bridge FET's threshold voltage to be lower than the body diode of the new gate drive FET. Signals are shared between N and P subcircuits to ensure the FETs are shut down. In each N or P pair, the opposing drive FET now also drives the other's newly added pulldown FET.

As shown in FIG. 19, this component is specific to low-voltage MR16 transformer discrimination (either electronic or magnetic). The issue is that magnetic transformers must have some capacitance to reduce voltage ripple, important for efficiency and EMC, whereas electronic transformers must not see capacitance for more than an instant or they risk stalling—or worse. The goal is therefore to make an intelligent decision to correctly enable or disable a rectifier capacitor. This is achieved by sensing the wave form coming into the rectifier, and deciding the most likely input source type based on the characteristics present. Serious complexity occurs when magnetic and electronic transformers begin to look alike, particularly when used with dimmers.

Referring to the schematic of FIG. 19, the "Rectifier cap decision block" interprets signals from one or more of the illustrated "Transformer detect points," and applies mathematical manipulations and state-based decisions to then turn the rectifier capacitor on or off via "CAP_SWITCH_CNTL."

Step-Down/Flyback

Figure 28:
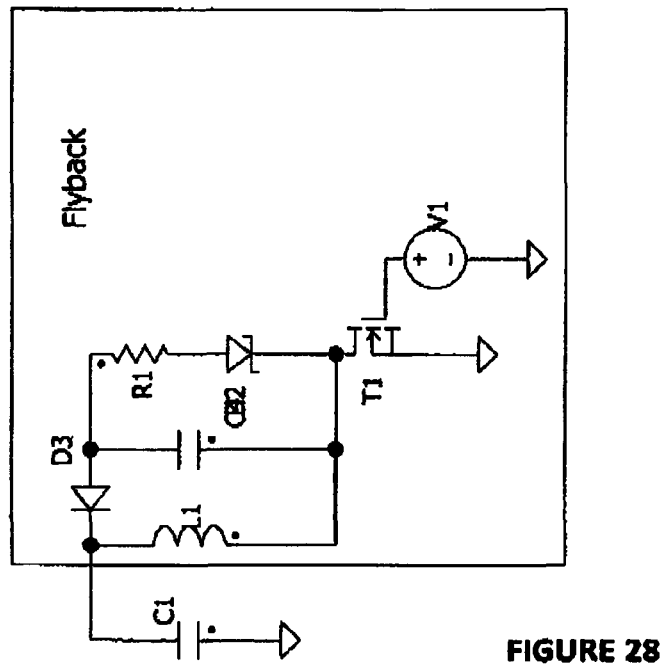
FIGS. 28 and 29 are circuit diagrams of power control circuitry of one embodiment of an add-on voltage control element to load of the present disclosure, showing step-down and flyback alternatives.
Figure 29:
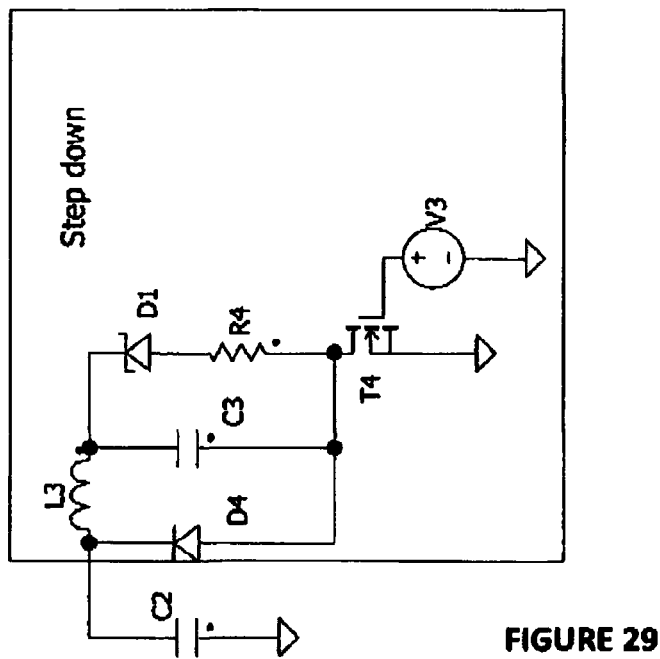
Figure 30:
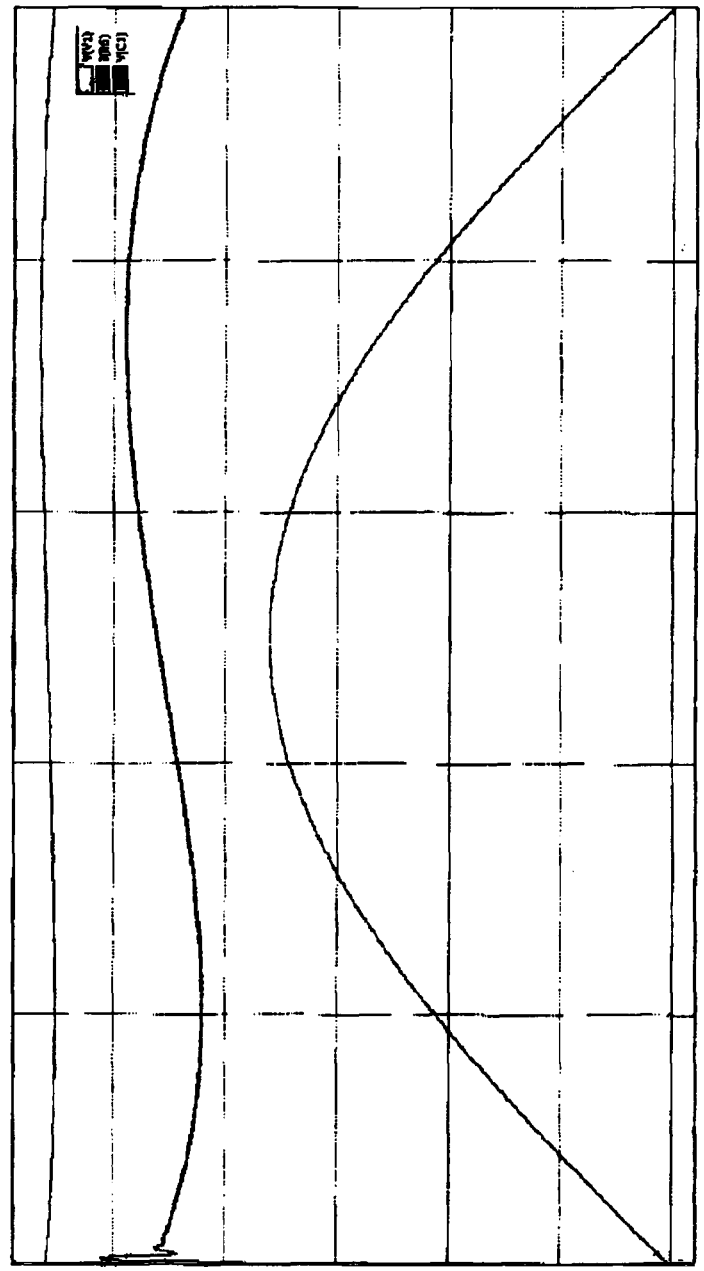
FIG. 30 is an operational trace of the V and I of a power control circuit using a step-down result on a load current.
Figure 31:
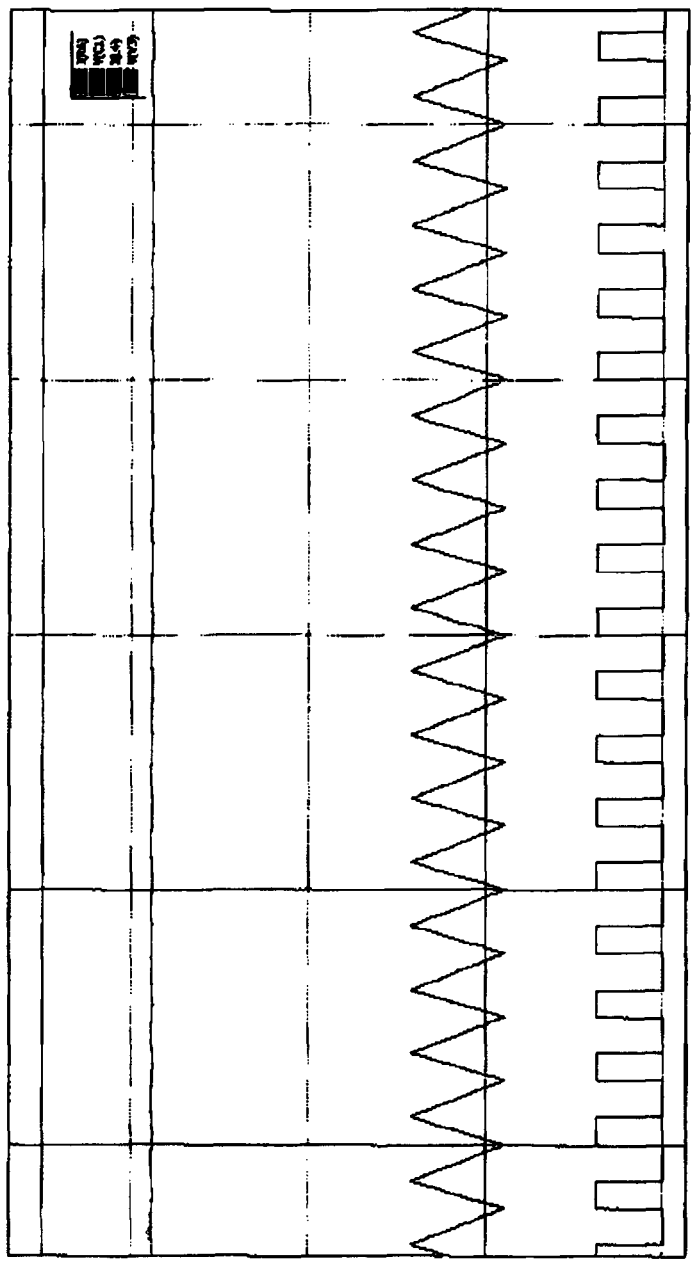
FIG. 31 is an operational trace of step-down showing simple FET fixed duty and frequency drive.

The step-down/flyback components shown in FIGS. 28 and 29 are often needed to connect at the output across capacitor C2, as shown in FIG. 2, for power control of light-emitting diodes (LEDs) due to operational voltage limitations. However, such a system may not be desired in other power control areas.

Due to the constant forward voltage (Vf) nature of LEDs, the usable energy in a capacitor connected in parallel is very limited. This is because any voltage in the capacitor above the LED Vf is quickly discharged at higher currents, until the voltage falls to Vf, at which point conduction stops. A simple approach to this is to have a resistor in series, which limits the current at voltages over Vf. The drawback, of course, is wasted energy in the resistor.

A more elaborate method is to implement a full "buck" circuit. Done well, this can minimize the additional power loss, at the expense of complexity and cost. A potential issue with this is the introduction of a negative impedance—as voltage goes up, current goes down, and vice versa. This is in contrast to a positive impedance, which has current and voltage moving up and down together, proportionally or otherwise. In a standalone circuit, a buck's negative impedance may not be an issue, but if used in conjunction with another control scheme, this may become problematic.

Another problem with having a capacitor directly in parallel with an LED occurs when using a boost topology. Because the output voltage must always be greater than the input voltage, LED Vf's must be relatively high. In the case of MR16, where the input voltage can reach over 17-Volt peak (12 VRMS), this limits the product to 20-Volt-plus LEDs. If use of a lower-voltage LED is desired, a natural solution is to introduce a buck stage after the boost. However, this introduces a problem wherein the individual boost and buck stages "fight" each other, which is why—despite the large capacitive energy reserve buffering between boost and buck stages—the booster frequently turns off due to over-voltage output conditions caused by a negative impedance load (the buck).

The present disclosure includes a much simpler step-down mechanism, which is much cheaper to implement and still provides the boost with a positive impedance.

FIG. 28 shows a general possible combination that can be used for a 9-Volt and a 21-Volt LED solution. Even though the 21-Volt LED already meets greater voltage specifications, the ripple current in the LED over mains frequencies (50-60 Hertz) is much better due to the more readily available energy reserve caused by the large operational voltage range now available.

There are advantage of bucks in the prior art, including allowing precise load regulation down to the load voltage (if buck) or complete range (if flyback). However, there are also issues with bucks and flybacks, including:

1. They are expensive.

2. Complex closed-loop systems are inefficient, particularly if a high-side FET drive is necessary (in buck configurations).

3. They impose negative impedance characteristics on the voltage supply.

4. Complexity and stability specifications generally limit maximum speed, which in turn call for larger passive components.

Similarly, there are advantages of fixed frequency and duty step-down or flyback:

1. The open loop (no feedback) is very cheap and easy to implement.

2. Only low-side switching is needed, so the system is easy to implement.

3. They impose positive impedance at all times and are easy to combine with a regulation stage, such as boost.

4. Simplicity means that upper speeds are only limited by resonant source drive capabilities and can be incredibly high.

An issue with fixed frequency and duty step-down or flyback includes the open loop, which means that operation is limited to fixed transformation of input voltage—i.e., no adaption is possible.

In FIG. 28, R4 is included in series with D1 to represent a "real" LED made up of desired and parasitic components. The step-down referred to in the 9-Volt schematic and traces has a very simple operation that implements an oscillating source of any type capable of driving a FET, in this example V3. When the FET is biased on, current begins to rise in L3 the LED (D1) and C3. When the FET turns off, the inductor discharges into D1 and C3. C3 acts purely as an AC bypass to keep the current ripple in the LED to a minimum, and can therefore be extremely small. This simple action results in L3 appearing as an additional impedance in series with the LED, varying only with the difference in voltage between the LED Vf and the reservoir C3. This impedance can be varied by either changing the inductance of L1, or the frequency/duty cycle ratio of the inverter.

The flyback referred to in the 21-Volt traces and schematics, as generally shown in FIG. 28, is also remarkably simple. When the FET is biased on, L1 begins to charge. When the FET is turned off, L1 discharges into C4 and the LED. Again, C4 is included to merely bypass AC, providing DC current to the LED. This circuit differs from the step-down in that it is possible to discharge C4 below the LED voltage. While desirable with a large Vf such as 21 Volts, this is highly undesirable with voltages already lower than the minimum allowed boost voltage. As with the step-down, the inductor appears as roughly a linear, positive impedance, so long as the frequency and duty cycle ratio are fixed.

Note that although any frequency and duty can be implemented, there are advantages to some adjustments, such as:

1. Frequency jitter can help if EMI is encountered.
2. Duty cycle ratios other than 50/50 (as used in the examples) may be useful, particularly if lower Vf's are desired, by setting the duty to, say, 15/85 (on/off) would allow step-down voltages as low as 3 Volts (single LED die) without adding any more complexity or feedback, depending on the oscillator source used.

Skilled persons will appreciate that modifications or changes to the described embodiments can be made without departing from the scope of the present disclosure. All such modifications and changes are intended to be included within the scope of this invention, as defined in the following claims.

The invention claimed is:

1. A switch-mode power supply implemented with cycle-by-cycle asynchronous control of a duty cycle of a switching-circuitry drive signal to produce a regulated flow of electrical load current from a voltage source, the switch-mode power supply comprising:
    a signal summing and comparing stage including:
        a comparison signal summing node configured to form a comparison signal having a first portion during an on state of the duty cycle and a second portion during an off state of the duty cycle such that the first and second portions are asynchronous to each other;
        comparator circuitry having a first input terminal, a second input terminal, and a drive output terminal, the first input terminal to receive a reference signal, the second input terminal to receive the comparison signal from the comparison signal summing node, and the drive output terminal to provide the switching-circuitry drive signal in response to a comparison between the reference signal and the comparison signal; and
    a control signal feedback system configured to control shaping of the first and second portions of the comparison signal, the control signal feedback system including control signal switching circuitry and load current detection circuitry, the control signal switching circuitry and the load current detection circuitry responsive to the switching-circuitry drive signal to establish the first and second portions having different comparison signal levels that, by operation of the comparator circuitry, asynchronously cycle the switching-circuitry drive signal so as to modify successive cycles of the duty cycle and thereby regulate the switch-mode power supply to deliver to a connected load the regulated flow of electrical load current.

2. The switch-mode power supply of claim 1, further comprising a rectifier.

3. The switch-mode power supply of claim 1, further comprising an open-loop step down stage for conditioning of the regulated flow of electrical load current.

4. The switch-mode power supply of claim 1, further comprising an external control input signal operatively associated with the first input terminal to control an operating point of the switch-mode power supply.

5. The switch-mode power supply of claim 1, further comprising:
    transformer-type detection circuitry configured to determine whether a transformer coupled to the switch-mode power supply is of an electronic or a magnetic type of transformer; and
    capacitor switching circuitry that, in response to determining the type of transformer, modifies an amount of capacitance coupled to the transformer.

6. The switch-mode power supply of claim 1, further comprising a Zener diode having its anode coupled to the comparison signal summing node and its cathode coupled to a voltage regulated node proximal the connected load.

7. The switch-mode power supply of claim 6, in which the anode is resistively coupled to the comparison signal summing node.

8. The switch-mode power supply of claim 1, in which the control signal switching circuitry is resistively coupled to the comparison signal summing node by a first resistor, and the load current detection circuitry is resistively coupled to the comparison signal summing node by a second resistor, the first and second resistors configured to establish a resistor network at the comparison signal summing node.

9. The switch-mode power supply of claim 1, in which the comparison signal summing node configured to form the comparison signal comprises a first comparison signal summing node configured to form a first comparison signal, and in which the reference signal comprises a second comparison signal, the switch-mode power supply further comprising a second comparison signal summing node configured to form the second comparison signal from an external control signal resistively coupled to the second comparison signal summing node and from a reference voltage resistively coupled to the second comparison signal summing node.

10. The switch-mode power supply of claim 1, in which the load current detection circuitry includes a capacitor resistively coupled to the comparison signal summing node.

11. The switch-mode power supply of claim 1, in which the control signal switching circuitry includes a transistor having a source terminal resistively coupled to the comparison signal summing node.

12. The switch-mode power supply of claim 1, in which the control signal switching circuitry includes a transistor having a gate terminal coupled to the drive output terminal to receive the switching-circuitry drive signal.

13. The switch-mode power supply of claim 1, in which the control signal switching circuitry includes a transistor having a drain terminal coupled to an output-side terminal of a boost-converter inductor.

\* \* \* \* \*